United States Patent
Oguri et al.

(10) Patent No.: US 8,645,868 B2
(45) Date of Patent: Feb. 4, 2014

(54) CONTROL DEVICE, CONTROL SYSTEM, METHOD AND COMPUTER READABLE MEDIUM FOR SETTING

(75) Inventors: Hirofumi Oguri, Nagoya (JP); Tetsuya Kato, Aichi-ken (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 479 days.

(21) Appl. No.: 12/334,074

(22) Filed: Dec. 12, 2008

(65) Prior Publication Data

US 2009/0157201 A1 Jun. 18, 2009

(30) Foreign Application Priority Data

Dec. 14, 2007 (JP) ................................. 2007-324067

(51) Int. Cl.
  *G06F 3/048* (2013.01)
  *G06F 3/00* (2006.01)
  *G06F 3/01* (2006.01)

(52) U.S. Cl.
  USPC ............................ 715/845; 715/700; 715/702

(58) Field of Classification Search
  USPC .................................................... 381/56, 103
  See application file for complete search history.

(56) References Cited

U.S. PATENT DOCUMENTS

| | | | | |
|---|---|---|---|---|
| 5,491,782 A | * | 2/1996 | King et al. | 715/833 |
| 5,615,347 A | * | 3/1997 | Davis et al. | 715/833 |
| 5,638,505 A | * | 6/1997 | Hemenway et al. | 715/769 |
| 5,861,886 A | * | 1/1999 | Moran et al. | 715/863 |
| 5,864,078 A | | 1/1999 | Koevering | |
| 5,908,997 A | | 6/1999 | Arnold et al. | |
| 6,104,398 A | * | 8/2000 | Cox et al. | 715/821 |
| 6,122,558 A | * | 9/2000 | Barnes et al. | 700/83 |
| 6,192,282 B1 | * | 2/2001 | Smith et al. | 700/19 |
| 6,389,464 B1 | * | 5/2002 | Krishnamurthy et al. | 709/220 |
| 7,057,747 B1 | * | 6/2006 | Minagawa | 358/1.13 |
| 2002/0005839 A1 | * | 1/2002 | Nojiri | 345/173 |
| 2002/0018051 A1 | * | 2/2002 | Singh | 345/173 |
| 2002/0109710 A1 | * | 8/2002 | Holtz et al. | 345/723 |
| 2002/0174209 A1 | * | 11/2002 | Sesek et al. | 709/223 |

(Continued)

FOREIGN PATENT DOCUMENTS

| | | |
|---|---|---|
| JP | 2000-513457 A | 10/2000 |
| JP | 2002-190852 A | 7/2002 |
| JP | 2003-131773 A | 5/2003 |
| JP | 2006-330306 A | 12/2006 |

OTHER PUBLICATIONS

"DualList Drag & Drop Component," published on Sep. 16, 2004, and retrieved from http://www.reflectionit.nl/DragDrop.aspx on Oct. 10, 2012.*

(Continued)

*Primary Examiner* — Tadeese Hailu
*Assistant Examiner* — Eric J Bycer
(74) *Attorney, Agent, or Firm* — Baker Botts L.L.P.

(57) ABSTRACT

There is provided a control device for making settings, comprising: a setting item selection unit configured to select setting items to which same setting should be set, from among a plurality of setting items regarding the control device, based on externally inputted instructions; a setting value accepting unit configured to accept setting to be set equally to the selected setting items selected by the setting item selection unit; and a setting unit configured to set the setting accepted through the setting value accepting unit to all of the selected setting items.

25 Claims, 14 Drawing Sheets

(56) References Cited

U.S. PATENT DOCUMENTS

| | | |
|---|---|---|
| 2003/0020760 A1 | 1/2003 | Takatsu et al. |
| 2003/0036909 A1 | 2/2003 | Kato |
| 2003/0112456 A1* | 6/2003 | Tomita et al. ............... 358/1.13 |
| 2003/0128195 A1* | 7/2003 | Banerjee et al. ............. 345/179 |
| 2003/0218642 A1 | 11/2003 | Sakayori et al. |
| 2004/0001098 A1* | 1/2004 | Numano ....................... 345/773 |
| 2004/0119763 A1* | 6/2004 | Mizobuchi et al. ........... 345/863 |
| 2004/0133553 A1* | 7/2004 | Suto ................................. 707/1 |
| 2004/0179695 A1* | 9/2004 | Terada et al. ................... 381/56 |
| 2006/0050142 A1* | 3/2006 | Scott et al. ................. 348/14.05 |
| 2006/0053387 A1* | 3/2006 | Ording .......................... 715/773 |
| 2006/0083533 A1* | 4/2006 | Maeshima ...................... 399/82 |
| 2006/0085756 A1* | 4/2006 | Srivastava et al. ............ 715/770 |
| 2006/0215857 A1* | 9/2006 | Hirano .......................... 381/119 |
| 2007/0176906 A1* | 8/2007 | Warren .......................... 345/173 |
| 2008/0201665 A1* | 8/2008 | Shimada ........................ 715/847 |
| 2009/0066984 A1* | 3/2009 | Sugaya ......................... 358/1.13 |

OTHER PUBLICATIONS

Japan Patent Office, Notification of Reasons for Rejection for Japanese Patent Application No. 2007-324067 (counterpart to above-captioned patent application), dispatched Oct. 11, 2011.

Japan Patent Office, Notification of Reasons for Rejection for Japanese Patent Application No. 2012-024762 (counterpart Japanese patent application), dispatched Mar. 12, 2013.

* cited by examiner

| MAJOR CLASS 12b1 | MEDIUM CLASS 12b2 | MINOR CLASS 12b3 | ITEM NAME 12b4 | TYPE 12b5 | VALUE 12b6 |
|---|---|---|---|---|---|
| FUNCTION SETTING | PRIMARY SETTING | MODE TIMER | ... | ... | ... |
| | | PAPER SIZE | ... | ... | ... |
| | | VOLUME | CALL SOUND | 5-OPTIONS SLIDE | 3 |
| | | | BEEP SOUND | 5-OPTIONS SLIDE | 3 |
| | | | SPEAKER SOUND | 5-OPTIONS SLIDE | 3 |
| | | AUTO-DAYLIGHT | ... | ... | ... |
| | | ON/OFF SETTING | ... | ... | ... |
| | | RECEPTION SETTING | ... | ... | ... |
| | FAX SETTING | TRANSMISSION SETTING | TRANSMISSION DATE AND TIME | 2-OPTIONS OF DIRECT OR SETTING | DIRECT |
| | | | REAL-TIME TRANSMISSION | 2-OPTIONS OF OFF/ON | OFF |
| | | | POLLING TRANSMISSION | 2-OPTIONS OF OFF/ON | OFF |
| | | | OVERSEAS TRANSMISSION | 2-OPTIONS OF OFF/ON | OFF |
| | | ... | ... | ... | ... |
| | ... | ... | ... | ... | ... |

FIG. 3

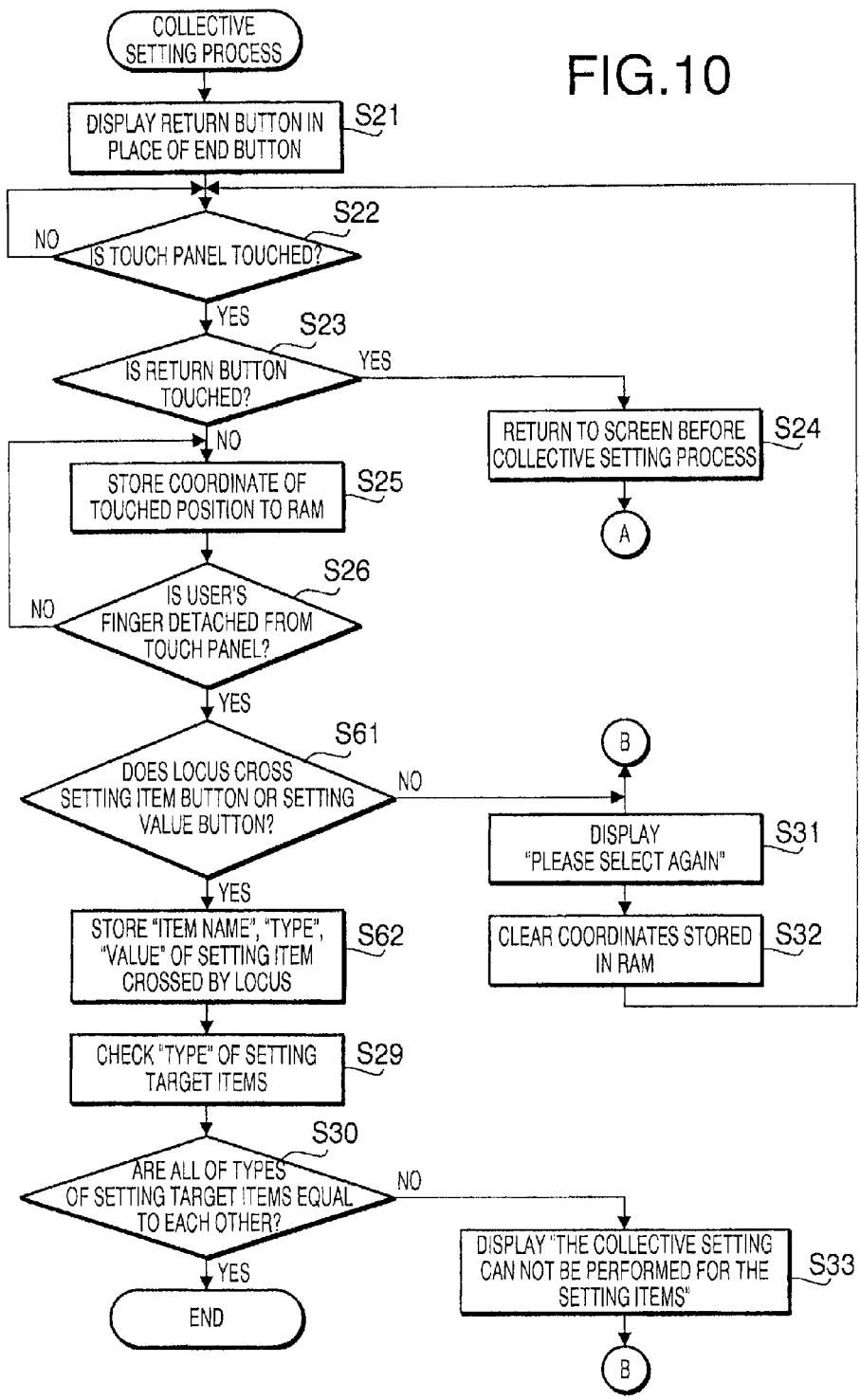

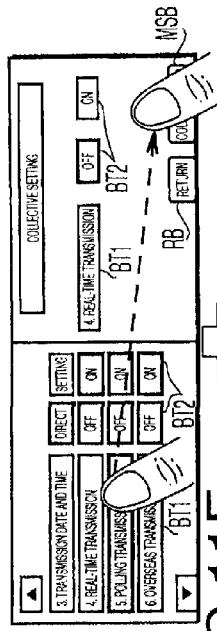
FIG.11A
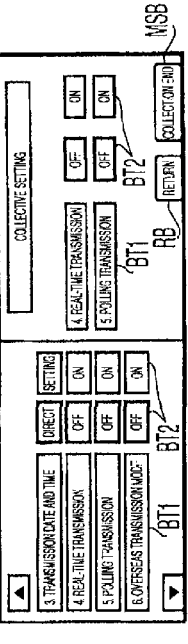
FIG.11B
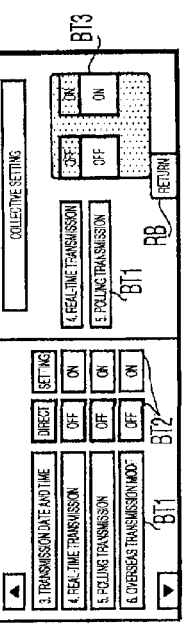
FIG.11C
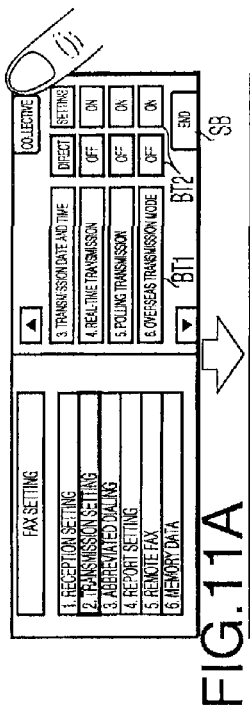
FIG.11E
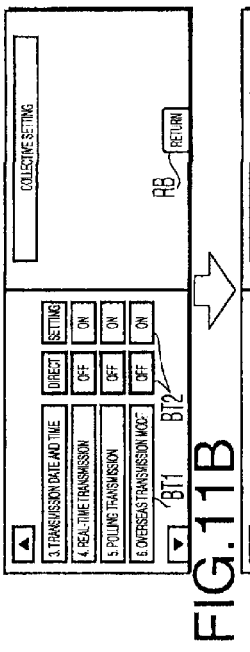
FIG.11F
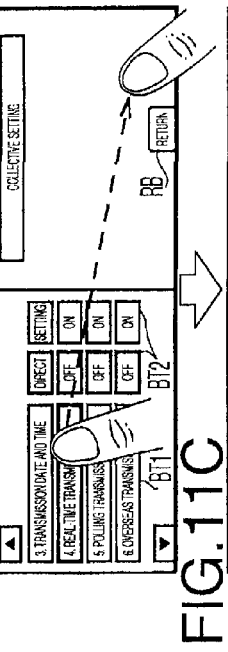
FIG.11G
FIG.11D

CONTROL DEVICE, CONTROL SYSTEM, METHOD AND COMPUTER READABLE MEDIUM FOR SETTING

CROSS-REFERENCE TO RELATED APPLICATION

This application claims priority under 35 U.S.C. §119 from Japanese Patent Application No. 2007-324067, filed on Dec. 14, 2007. The entire subject matter of the application is incorporated herein by reference.

BACKGROUND

1. Technical Field

Aspects of the present invention relate to a control device or a control system for making settings of a plurality of setting items for the control device.

2. Related Art

Recently, with development of the semiconductor technology and the mounting technology, the number of functions implemented on a single control device is increasing. For example, a multifunction peripheral having a plurality of functions, such as a facsimile function, a print function, a scanner function and a copying function have become widespread.

Such a multifunction device has a plurality of setting items for defining operation conditions, such as resolution, density and a zoom ratio. In order to execute a desired operation on the multifunction peripheral, a user changes settings of each setting item. It is understood that since the multifunction peripheral have a number of setting items, the setting operation for setting each setting item is troublesome for the user.

Japanese Patent Provisional Publication No. 2006-330306A (hereafter, referred to as JP2006-330306A) discloses a system in which an information processing device is provided with, for each of operation modes of a multifunction device, a table storing settings of a plurality of setting items. When a user selects an operation mode, the information processing device reads the settings of a table corresponding to the operation mode selected by the user, and transmits the settings registered in the table to the multifunction device. According to the system, the user is able to designate a desired operation mode for which the user wants to make settings.

SUMMARY

However, the system disclosed in JP2006-330306A, the user needs to select a mode for which the user wants to make settings. That is, the user needs to make settings for each of the tables (i.e., for each of the operation modes). Therefore, the setting operation is troublesome for the user.

Aspects of the present invention are advantageous in that at least one of a control device, a control system, a method and a computer readable medium capable of enabling a user to set setting values to desired setting items without requesting the user to conduct a troublesome user operation is provided.

According to an aspect of the invention, there is provided a control device for making settings, comprising: a setting item selection unit configured to select setting items to which same setting should be set, from among a plurality of setting items regarding the control device, based on externally inputted instructions; a setting value accepting unit configured to accept setting to be set equally to the selected setting items selected by the setting item selection unit; and a setting unit configured to set the setting accepted through the setting value accepting unit to all of the selected setting items.

Such a configuration makes it possible to set setting to all of selected setting items collectively by selecting the setting items to which same setting should be set equally. Therefore, the user is able to change the setting of the setting items for which the user wants to change the setting without conducting a troublesome user operation.

According to another aspect of the invention, there is provided a method to be implemented on a control device for making settings, comprising the steps of: selecting setting items to which same setting should be set, from among a plurality of setting items regarding the control device, based on externally inputted instructions; accepting setting to be set equally to the selected setting items; and setting the accepted setting to all of the selected setting items.

Such a configuration makes it possible to set setting to all of selected setting items collectively by selecting the setting items to which same setting should be set equally. Therefore, the user is able to change the setting of the setting items for which the user wants to change the setting without conducting a troublesome user operation.

According to another aspect of the invention, there is provided a computer readable medium having computer readable instruction stored thereon, which, when executed by a processor of a control device, configures the processor to perform the steps of: selecting setting items to which same setting should be set, from among a plurality of setting items regarding the control device, based on externally inputted instructions; accepting setting to be set equally to the selected setting items; and setting the accepted setting to all of the selected setting items.

Such a configuration makes it possible to set setting to all of selected setting items collectively by selecting the setting items to which same setting should be set equally. Therefore, the user is able to change the setting of the setting items for which the user wants to change the setting without conducting a troublesome user operation.

According to another aspect of the invention, there is provided a control system for making settings, comprising: a setting item selection unit configured to select setting items to which same setting should be set, from among a plurality of setting items regarding a control device in the control system, based on externally inputted instructions; a setting value accepting unit configured to accept setting to be set equally to the selected setting items selected by the setting item selection unit; and a setting unit configured to set the setting accepted through the setting value accepting unit to all of the selected setting items.

Such a configuration makes it possible to set setting to all of selected setting items collectively by selecting the setting items to which same setting should be set equally. Therefore, the user is able to change the setting of the setting items for which the user wants to change the setting without conducting a troublesome user operation.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIG. 3 illustrates an example of a data structure of a setting item memory.

FIG. 10 is a flowchart illustrating a collective setting process executed by the MFP according to the second embodiment.

FIGS. 11A-11G illustrate transitions of onscreen representation of a setting item change screen according to a third embodiment.

FIGS. 14A and 14B show other examples of the setting item change screen.

DETAILED DESCRIPTION

Hereafter, an embodiment according to the invention will be described with reference to the accompanying drawings.

First Embodiment

Figure 1:
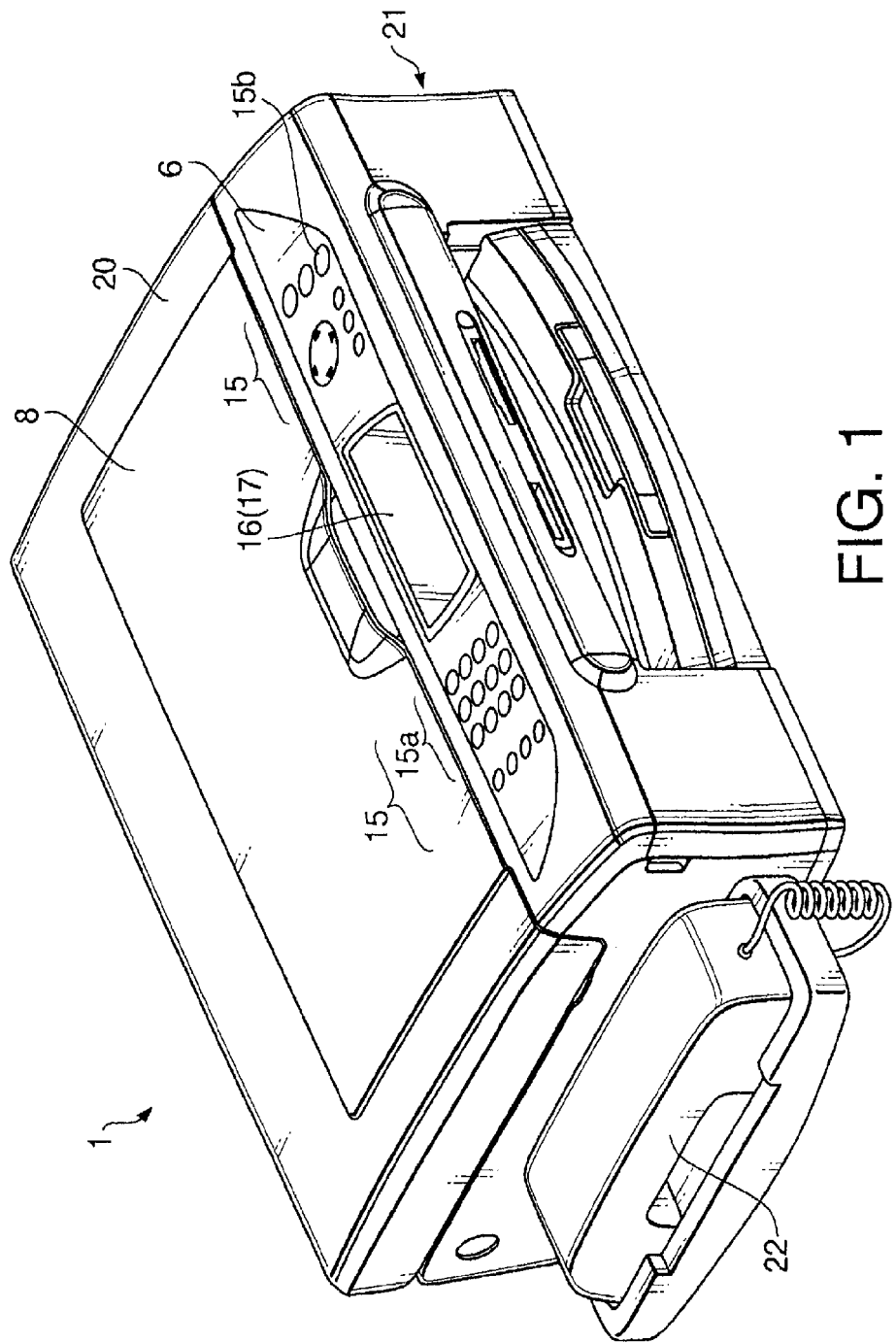
FIG. 1 is a perspective view illustrating an outer appearance of an MFP according to a first embodiment.

FIG. 1 is a perspective view illustrating an outer appearance of an MFP (multifunction peripheral) 1 according to a first embodiment. The MFP 1 includes multiple functions including a telephone function, a facsimile function, a print function, a scanner function and a copying function. The MFP 1 is configured to have a various types of setting items for defining operation conditions of the above described various functions, and to allow a user to make settings for a desired setting item without requesting the user to conduct troublesome user operations.

On the side of the MFP 1, a handset 22 is provided. The handset 22 is used by the user to conduct telephone communication with an external device 200 (see FIG. 2) which is connected to the MFP 1 via a telephone network 100 (see FIG. 2).

On the top of the MFP 1, a scanner 20 is provided to read a document during execution of the facsimile function, the scanner function and the copying function. Under a document cover 8, a platen glass on which a document is placed is located. In a body case of the MFP 1, a printing unit 21 executing a print operation, for example, by an inkjet print process is accommodated.

On the front side of the document cover 8, an operation panel 6 having a rectangular form elongated in a lateral direction is provided. On the operation panel 6, operation keys 15, an LCD unit 16, and a touch panel 17 are provided. The operation keys 15 include numeric buttons 15a for inputting a telephone number to user the telephone function or the facsimile function, a power button 15b for turning on or off the MFP 1.

The LCD unit 16 includes an LCD panel. The MFP 1 displays, on the LCD panel, various types of information including an operation procedure, a status of a process running on the MFP 1, or information concerning operations of the operation keys 15 or the touch panel 17. When the user operates the MFP 1 to change settings of the setting items, the MFP 1 displays a setting item change screen (see FIGS. 4 and 5) on the LCD panel.

As described in detail below, on the setting item change screen, various types of setting items and a collective setting button MB are displayed. The user is allowed to change settings for each of the setting items. If the user operates the collective setting button MB, two or more setting items to which common settings can be set are selected and the common settings are set to a plurality of selected setting items at a time. That is, in this case, the same settings are set to the selected setting items collectively.

The touch panel 17 which functions as an inputting device is placed on the LCD panel pf the LCD unit 16. When the user touches a position on a surface of the touch panel 17 by a finger, the touch panel 17 detects the position touched by the finger of the user.

When the user touches the surface of the LCD panel on which the setting item change screen is displayed, the MFP 1 judges whether the position touched by the user matches one of display positions of the setting items of the collective setting button MB in accordance with the detected position by the touch panel 17. If the position detected by the touch panel 17 matches one of the display positions of the setting items and the collective setting button MB, the MFP 1 judges that one of the setting items and the collective setting button MB is operated by the user, and executes one of various processes corresponding to the user operation as described in detail below.

With this configuration, the user is able to make settings in an intuitive manner by touching by the user' finger the setting items or the collective setting button MB displayed on the setting item change screen while viewing the setting item change screen.

Figure 2:
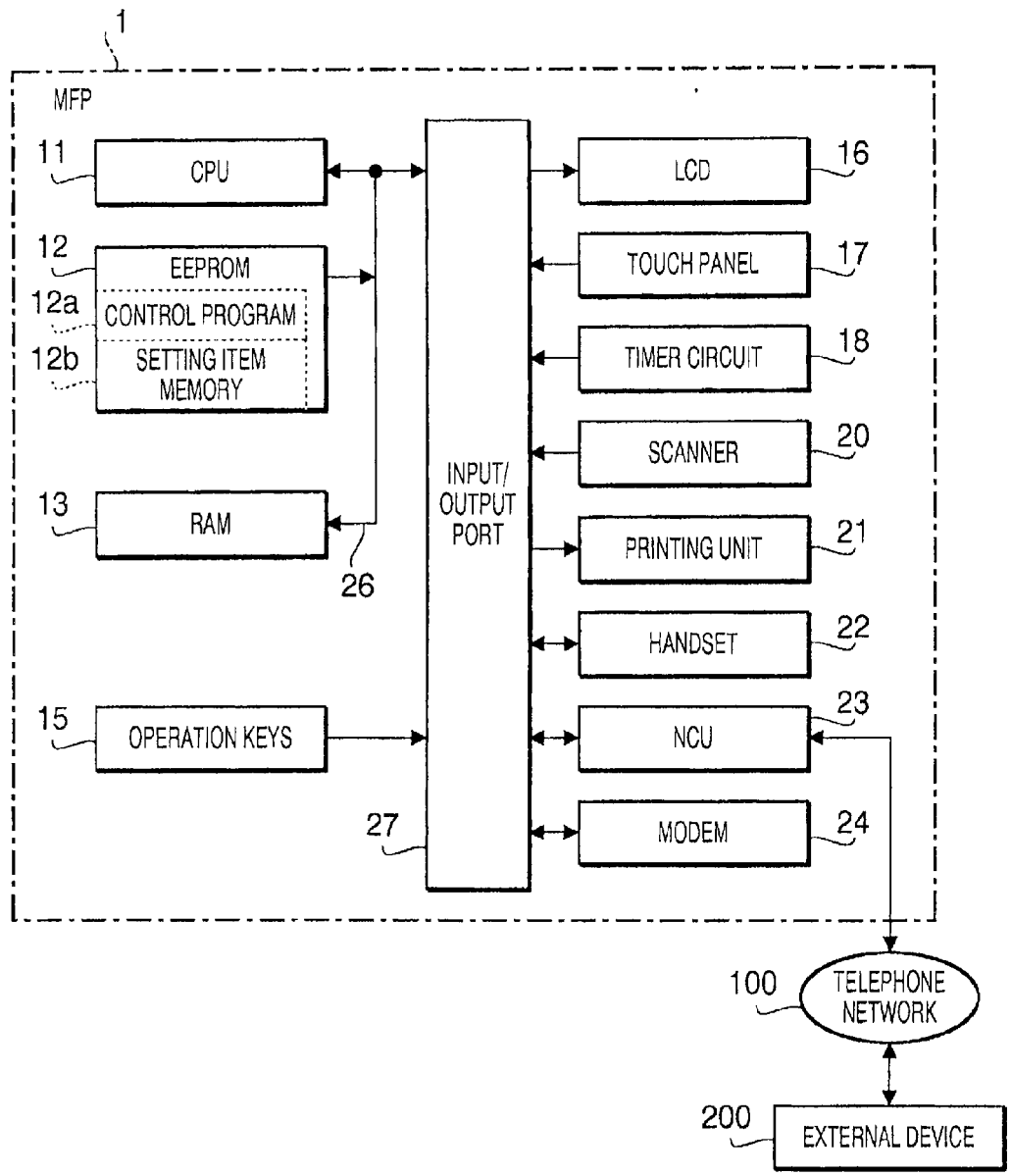
FIG. 2 is a block diagram of an electrical configuration of the MFP.

Hereafter, an electrical configuration of the MFP 1 is explained with reference to FIG. 2 which is a block diagram of the electrical configuration of the MFP 1. As shown in FIG. 2, the MFP 1 includes a CPU (Central Processing Unit) 11, an EEPROM (Electrically Erasable and Programmable Read Only Memory) 12, a RAM (Random access Memory) 13, the operation keys 15, the LCD unit 16, the touch panel 17, a timer circuit 18, the scanner 20, the printing unit 21, the handset 22, an NCU 23 and a modem 24.

The CPU 11, the EEPROM 12 and the RAM 13 are connected to each other a bus line 26. The operation keys 15, the LCD unit 16, the touch panel 17, the timer circuit 18, the scanner 20, the printing unit 21, the handset 22, the NCU 12, the modem 24 and the bus line 26 are connected to each other via an input/output port.

The CPU 11 controls functions of the MFP 1 and the above described components connected to the input/output port 27 in accordance with fixed data and programs stored in the EEPROM 12 or the RAM 13 or various signals transmitted or received via the NCU 23.

Figure 6:
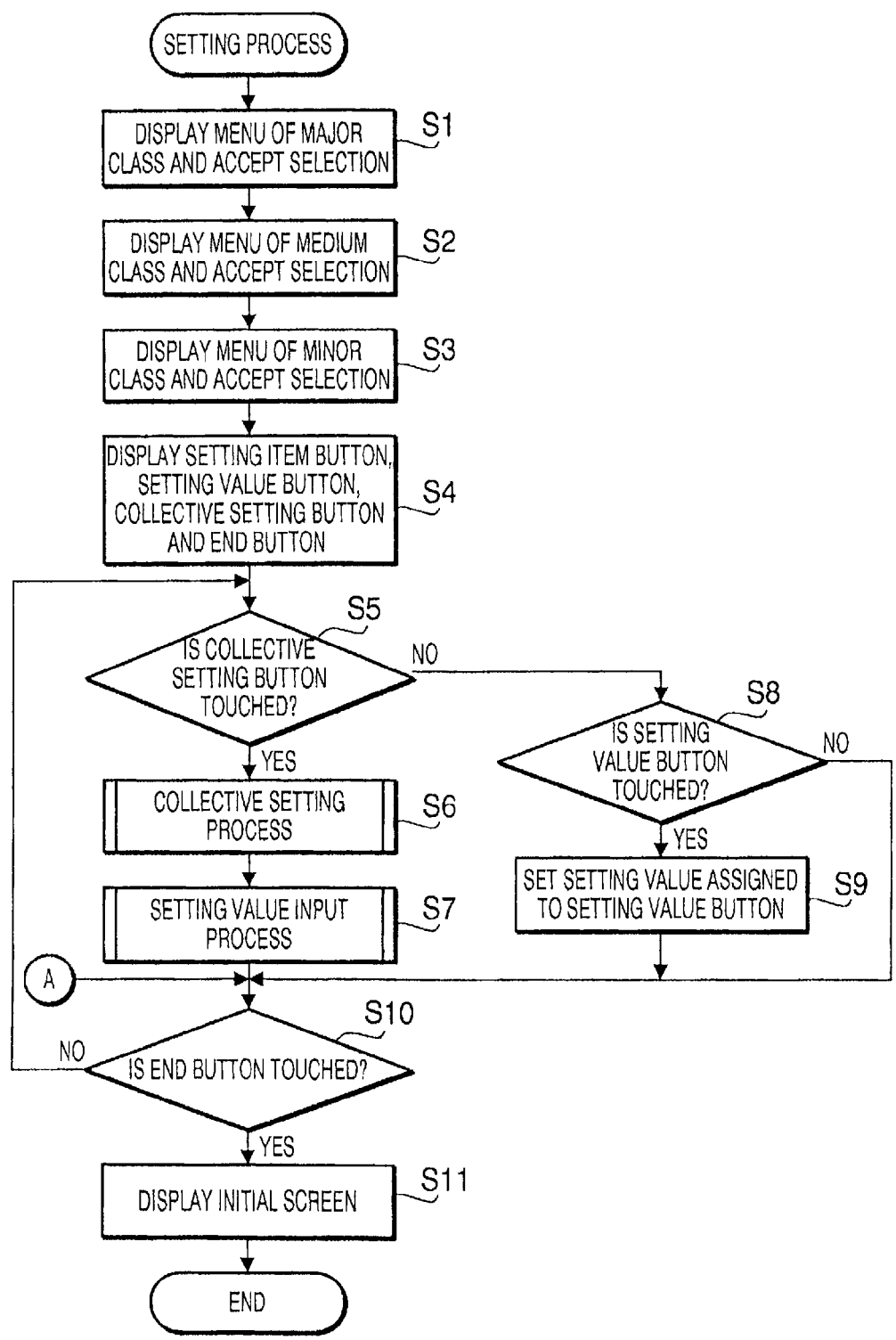
FIG. 6 is a flowchart illustrating a setting process executed by the MFP.
Figure 7:
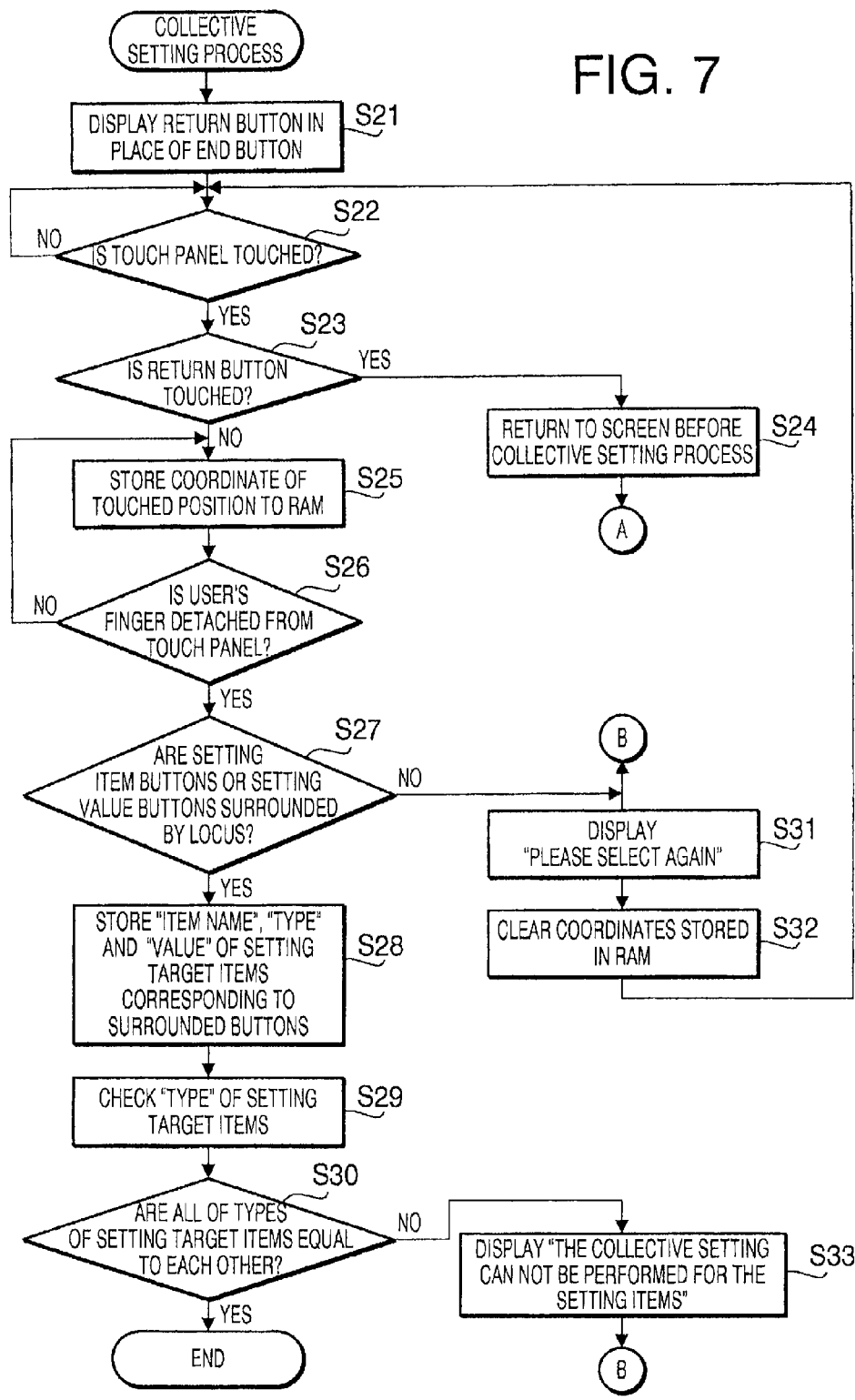
FIG. 7 is a flowchart illustrating a collective setting process executed by the MFP.
Figure 8:
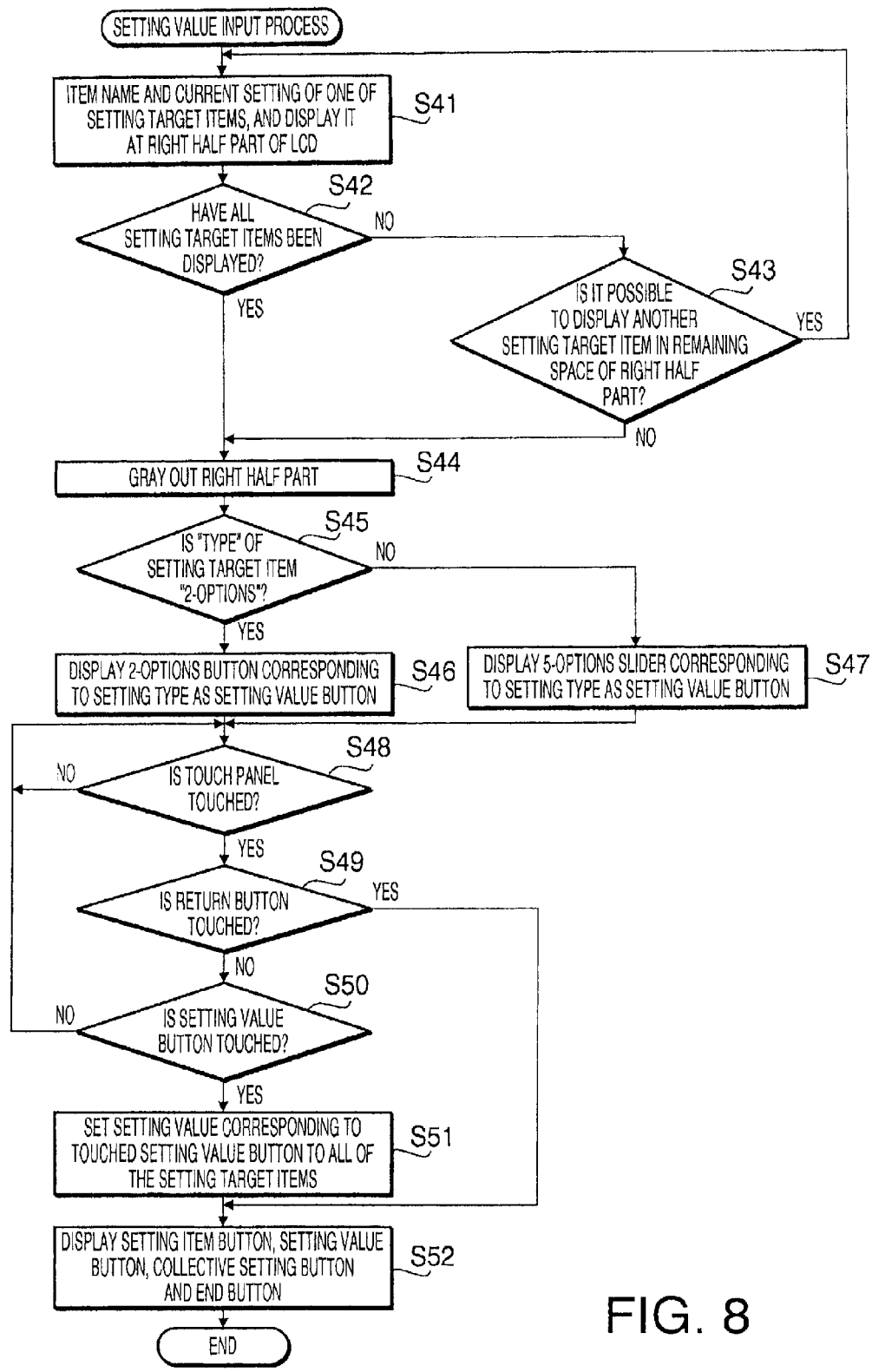
FIG. 8 is a flowchart illustrating a setting value input process executed by the MFP.

EEPROM 12 stores various types of programs and data including control programs 12a and fixed data which can be rewritten. That is, the EEPROM 12 is a non-volatile memory capable of maintain the stored data in a power off state. The control programs 12a include programs whose flowcharts are illustrated in FIGS. 6 to 8. When the control programs are executed by the CPU 11 of the MFP 1, the user is able to change settings of a desired setting item without conducting a troublesome user operation.

The EEPROM 12 is provided with a setting item memory 12b. The setting item memory 12b is a memory for storing information concerning setting items for defining the operation conditions of the various functions of the MFP 1. The setting item memory 12b is explained in detail later with reference to FIG. 13.

The RAM 13 is used as a work memory to temporarily store various types of data used during execution of various operations conducted on the MFP 1. The timer circuit 18 has a function of providing time information.

The NCU 23 is connected to the telephone network 100, and controls connection with the external device 200 which is connected to the telephone network 100 by transmitting a dialing signal to the telephone network 100 or controlling, for example, a response to a call signal from the telephone network 100.

The modem 24 has functions of modulating image data which the modem is instructed by the facsimile function to transmit, to convert the image data into a signal which can be transmitted through the telephone network 100, and transmitting the signal via the NCU 23. The modem 24 also has functions of receiving a signal inputted from the telephone network 100 via the NCU 23, displaying information on the LCD unit 16, and demodulating the signal to convert the signal into image data recoated by the printing unit 21 on a recording medium.

Hereafter, the setting item memory 12b is explained with reference to FIG. 3. FIG. 3 illustrates an example of a data structure of the setting item memory 12b. As shown in FIG. 3, the setting item memory 12b includes classification groups of a major class 12b1, a medium class 12b2, a minor class 12b3, and an item name 12b4. The major class 12b1, the medium class 12b2, and the minor class 12b3 are preprogrammed in the setting item memory 12b at a manufacturing stage.

Through the major class 12b1, the medium class 12b2 and the minor class 12b3, classification for the setting items are defined in three layers to enhance the searching property for the setting items. The major class 12b1 defines, as a top level layer, a rough class. The medium class 12b2 is defined as the second layer by subdividing the major class 12b1. The minor class 12b3 is defined as the lowest layer by subdividing the medium class 12b2. Various setting items (i.e., item names defining names of setting items) are associated with each of classification items defined in the minor class 12b3.

Regarding the example shown in FIG. 3, "function setting" is defined in the major class 12b1, various items including "primary setting" and "FAX setting" are defined in the medium class 12b2 by subdividing the "function setting". Further, "mode timer", "paper size", "volume", "auto-daylight" and "on/off setting" are defined in the minor class 12b3 by subdividing the "primary setting", and "reception setting" and "transmission setting" are defined in the minor class 12b3 by subdividing the "FAX setting".

For example, to "volume" which is one of items in the minor class 12b3 associated with the "primary setting" in the medium class 12b2, "call sound", "beep sound", "speaker sound" defined as the setting items 12b4 are related. For example, to "transmission setting" which is one of items in the minor class 12b3 associated with the "FAX setting" in the medium class 12b2, various items including "transmission date and time", "real-time transmission", "polling transmission", and "overseas transmission mode" defined as the setting items 12b4 are related.

The MFP 1 is configured to allow the user to search for a desired setting item in accordance with the major class 12b1, the medium class 12b2, the minor class 12b3 and the item name 12b4 defined in the setting item memory 12b. If the user wants to change setting of "call sound", the user is able to display the setting item "call sound" on the setting item change screen (see FIG. 4) by selecting, from a menu displayed in the LCD unit 16, "function setting" in the major class 12b1, selecting "primary setting" in the medium class 12b1, and selecting "volume" in the minor class 12b3.

If the user wants to change all setting items related to "transmission setting" concerning the facsimile function collectively, the user is able to display, on the setting item change screen (see FIG. 5), the setting items related to the "transmission setting" of the facsimile function including "transmission date and time", "real-time transmission", "polling transmission", "overseas transmission mode" by selecting, from a menu displayed on the LCD unit 16, "function setting" in the major class 12b1, selecting "FAX setting" in the medium class 12b2, and selecting "transmission setting" in the minor class 12b3.

Regarding the setting item memory 12b, a "type" 12b5 and a "value" 12b6 are included in association with each of the setting items 12b4. The "type" 12b5 stores values which can be set to the each setting item defined in the setting item name 12b4. The values in the "type" 12b5 may be set at the manufacturing stage of the MFP 1.

The "value" 12b6 stores current values of the setting items defined in the setting item name 12b4. In the "value" 12b6, initial values have been set in advance at the manufacturing stage. When the settings of a certain setting item are changed by the user, the changed settings are set to the "value" 12b6 corresponding to the setting name (12b4) of the changed setting item. That is, the "value" 12b6 is overwritten with the changed settings.

As shown in the example of FIG. 3, in each of fields of the "type" 12b5 respectively corresponding to the "call sound", "beep sound" and "speaker sound" in the item name 12b4, "5-options slide" indicating that the magnitude can be set in five levels is stored. In each of fields in the "value" 12b6 respectively corresponding to the fields having the above described setting of "5-options slide" in the "type" 12b5, "3" is set. "3" in the "type" 12b5 means that the current setting for the setting item is three.

In a field of the "type" 12b5 corresponding to the setting item "transmission date and time", "two-options of direct or setting" is stored. "two-options of direct or setting" means that one of "direct" or "setting" can be set for the setting item "transmission date and time". In a field of the "value" 12b6 corresponding to the setting item "transmission date and time", setting of "direct" is stored. This means that the current setting of the setting item "transmission date and time" is "direct".

In each of fields of the "type" 12b5 corresponding to the setting items "real-time transmission", "polling transmission", and "overseas transmission mode", "two-options of OFF/ON" indicating that one of "OFF" and "ON" can be set is stored. In each of fields of the "value" 12b6 corresponding to the setting items "real-lime transmission", "polling transmission", and "overseas transmission mode", "OFF" is set. This means that the current setting for these setting items is "OFF".

As shown in FIGS. 4A-4E and 5, the setting item change screen displays setting item buttons BT1 respectively representing names of the setting items in accordance with the setting names defined in the "item name" 12b4, and setting value buttons BT2 and BT3 allowing the user who wants to change the settings to input settings to be set for a corresponding setting item.

Regarding the "5-options slide" defined in the "type" 12b5, a 5-options slider is displayed as the setting value button BT2 or BT3 on the setting item change screen. Regarding the "two-options of direct or setting" or "two-options of OFF/ON" defined in the "type" 12b5, a two-options button is displayed as the setting value button BT2 or BT3 in the setting item change screen.

In the following, it is assumed that "5-options slide", "two-options of direct or setting" or "two-options of OFF/ON" is set for fields in the "type" 12b5 for the sake of simplicity. However, various types of setting types may be used in fields of the "type" 12b5. If the setting type other than the "5-options slide", "two-options of direct or setting" and "two-options of OFF/ON" is used, the setting values button BT2 or BT3 is created in accordance with the setting type to be used.

Hereafter, the setting item change screen which is displayed on the LCD unit 16 when a user command for changing settings for the setting items is inputted by the user is explained with reference to FIGS. 4A-4E and 5. FIGS. 4A-4E show transitions of the onscreen representation of the setting item change screen operated by the user when the setting items "call sound", "beep sound" and "speaker sound" corresponding to the "volume" in the minor class 12b3, the "primary setting" in the medium class 12b2 and the "function setting" in the major class 12b1 are changed collectively.

FIGS. 5A-5D show transitions of the onscreen representation of the setting item change screen operated by the user when the "real-time transmission", "polling transmission" and "overseas transmission" of the setting items associated with the "transmission setting" which is defined in the minor class 12b3 and corresponds to the "FAX setting" in the medium class 12b2 and the "function setting" in the primary class 12b1 are changed collectively.

When the user command for changing the settings of the setting items is inputted to the MFP 1 by the user, the MFP 1 displays a menu screen for each of the major class and the medium class. When the user selects "function setting" and "primary setting" on the menus of the major class and the medium class, respectively, the onscreen representation shown in FIG. 4 is provided. On the screen shown in FIG. 4A, a list menu including "mode timer", "paper size", "volume", "auto-daylight" and "ON/OFF setting" contained in the medium class "primary setting" is displayed on the left half part of the LCD unit 16.

When the "volume" is selected by the user from a menu of the minor class displayed on the left half part of the LCD unit 16, the setting item buttons BT2 representing the names of the setting items "call sound", "beep sound" and "speaker sound" associated with the "volume" are displayed together with the setting value buttons BT2 on the right half part of the LCD unit 16.

Figure 4A:
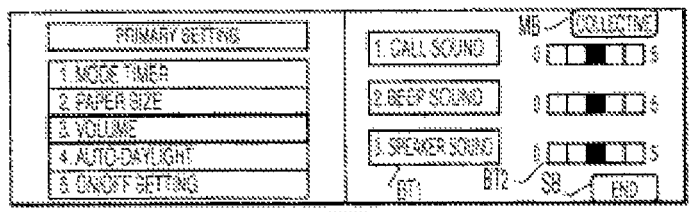
FIGS. 4A-4E show transitions of onscreen representation of an example of a setting item change screen on the MFP.

Regarding the example shown in FIG. 4A, the 5-options sliders are displayed as the setting value buttons BT2 for the setting items "call sound", "beep sound" and "speaker sound because the "5-options slide" is set for each of these setting items in the "type" 12b5.

Since "3" is set for each of these setting items in the "value" 12b6 in the setting item memory 12b, the 5-options slider for each of these items is displayed such that color of the position corresponding to the level "3" is different from color of the other positions on the 5-options slider. Therefore, the user is able to visibly recognize that the current setting for these setting items is the level 3.

When the user touches one of the setting value buttons BT2 of the setting items with the user's finger and then moves the user's finger to slide the 5-options slider of the selected setting value button BT2, the MFP 1 obtains, based on the detection result of the touch panel 17, the setting item corresponding to the setting value button BT2 touched by the user and the movement of the user's finger. At this time, the MFP 1 changes the settings of the setting item being operated by the user in accordance with the movement of the user's finger, and stores the setting displayed when the user removes the user's finger from the touch panel 17 by overwriting the "value" 12b6 corresponding to the selected setting item.

In addition to the setting item buttons BT1 and setting values buttons BT2, the MFP 1 displays a end button SB on the lower right part of the setting item change screen shown in FIG. 4A and the collective setting button MB on the upper right part of the setting item change screen shown in FIG. 4A. If the end button SB is touched by the user, the MFP 1 judges that the end button SB is operated by the user in accordance with the detection result of the touch panel 17, and ends representation of the setting item change screen, and displays an initial screen.

Figure 4B:
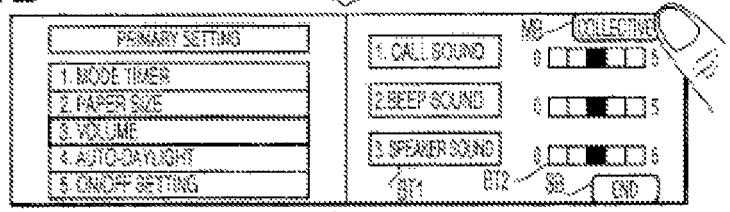

If the collective setting button MB is touched by the user as shown in FIG. 4B, the MFP 1 judges that the collective setting button MB is operated by the user based on the detection result of the touch panel 17, and moves to "a collective setting" mode. In the collective setting mode, the MFP 1 accepts a plurality of setting items to which the user wants to set the same settings collectively, and sets the same settings to the plurality of accepted setting items.

Figure 4C:
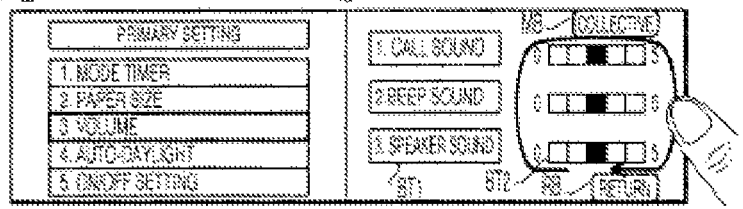

As shown in FIG. 4C, when the user moves the user's finger contacting the screen to surround the setting item buttons BT1 or the setting value buttons BT2 corresponding to the setting items to which the user wants to set the same settings collectively, the MFP 1 recognizes the setting item buttons BT1 or the setting value buttons BT2 ("call sound", "beep sound" and "speaker sound" in FIG. 4C) surrounded by a locus of the movement of the user's finger as setting target items based on the detection result of the touch panel 17.

When the MFP 1 has moves to the collective setting mode, the MFP 1 displays a return button RB on the lower right part of the setting item change screen in place of the end button SB. If the user touches the return button 14B, the MFP 1 judges that the return button RB is operated by the user, and exits the collective setting mode to move to the state of displaying the setting item change screen shown in FIG. 4A. The MFP 1 displays the return button RB constantly during the collective setting mode.

Figure 4D:
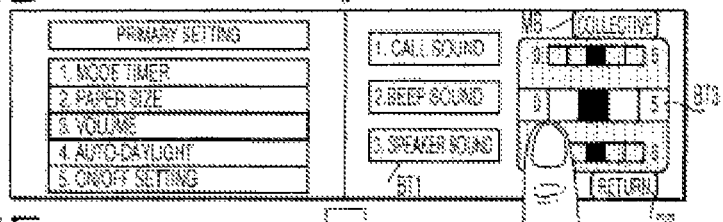

When the setting target items are selected by the user in the collective setting mode as shown in FIG. 4B, the MFP 1 newly display a setting value button (5-options slider) BT3 for setting the same value to the setting target items (see FIG. 4D). When the user touches the setting value button BT3 with the user's finger and moves the user's finger to slide the 5-options slider (setting value button BT3), the MFP 1 detects the position of the user's finger and the movement of the user's finger in accordance with the detection result of the touch panel 17.

On the displayed setting value button BT 3, the MFP 1 changes the setting to be set to the setting target items in accordance with the movement of the user's finger. When the MFP 1 judges that the user's finger is detached from the screen based on the detection result of the touch panel 17, the MFP 1 stores the setting displayed when the user's finger is detached from the screen by overwriting the fields of the "value" 12b6 corresponding to all of the setting target items. In this case, the MFP 1 changes the statuses of the setting value buttons BT2 corresponding to the setting target items to the newly stored setting (see FIG. 4E). Subsequently, the MFP 1 exits the collective setting mode to return to a normal mode.

Figure 4E:
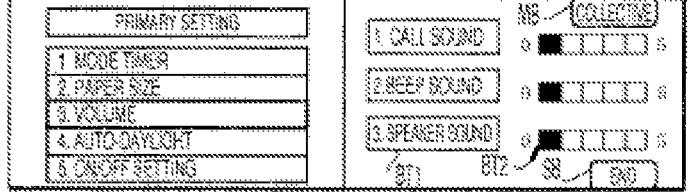

The setting item change screen shown in FIG. 4E is the same as that shown in FIG. 4A excepting that the changed setting is displayed on each setting value button BT2. In particular, FIG. 4E shows an example configuration in which the setting values of the "Call Sound," "Beep Sound," and "Speaker Sound" setting items have collectively been changed to setting values of "1." The user is able to change the settings of each setting item separately or change the settings of the setting target items collectively until the end button SB is operated by the user on the setting item change screen shown in FIG. 4E.

Figure 5A:
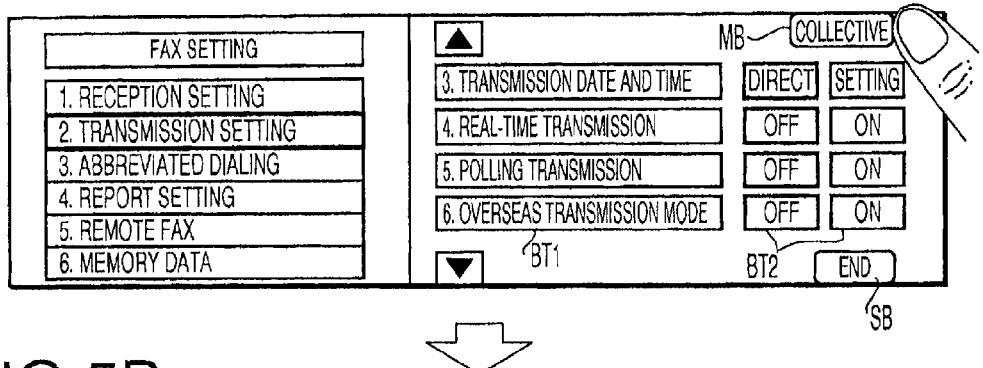
FIGS. 5A-5D show transitions of onscreen representation of another example of a setting item change screen on the MFP.

As shown in FIG. 5A, when the user who wants to change settings of the MFP 1 selects "function setting", "FAX setting" and "transmission setting" from the menus of the major class, the medium class and minor class, respectively, the MFP 1 displays the setting item buttons BT1 of the names of the setting items "transmission date and time", "real-time transmission", "polling transmission" and "overseas transmission" associated with the minor class "transmission setting" on the right half part of the setting item change screen. Further, on the right part of the screen shown in FIG. 5A, the MFP 1 displays the setting values buttons BT2 respectively corresponding to the setting item buttons BT1.

Since "two-options of direct or setting" is stored in the field in the "type" $12b5$ corresponding to the setting item "transmission date and time", the MFP 1 displays a two-options button for allowing the user to select one of the "direct" and "setting" as the setting value button BT2 for the "transmission date and time" (see FIG. 5A).

Since "two-options of OFF/ON" is stored in the fields in the "type" $12b5$ respectively corresponding to the setting items "real-time transmission", "polling transmission" and "overseas transmission", the MFP 1 display two-options buttons for allowing the user to select one of the "OFF" and "ON" as the setting value buttons BT2 for these setting items (see FIG. 5A).

For each of the setting value buttons BT2 respectively corresponding to the setting target items, the MFP 1 further highlights one of settable values currently set in the corresponding field of the "value" $12b6$.

As in the case of the screen shown in FIG. 4A, the MFP 1 displays the end button SB and the collective setting button MB on the setting item change screen shown in FIG. 5A. As in the case of the screen shown in FIG. 4B, when the collective setting button MB is touched by the user, the MFP 1 moves to the collective setting mode.

Figure 5B:
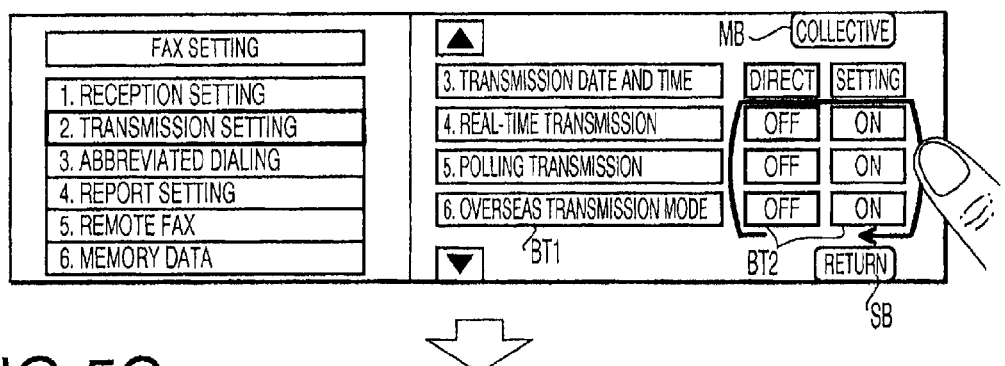
Figure 5C:
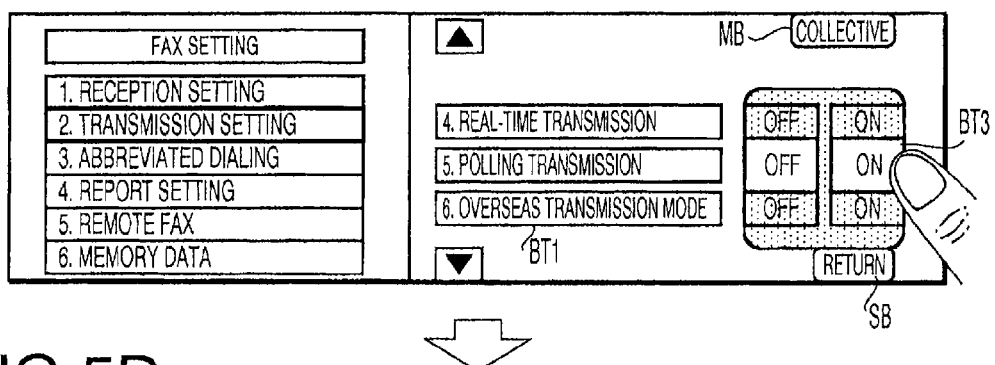

As shown in FIG. 5B, when the user moves the user's finger to surround the setting item buttons BT1 or the setting value buttons BT2 corresponding to the setting items to which the user wants to set the same value collectively, the MFP 1 recognizes the setting buttons BT1 or the setting value buttons BT2 surrounded by a locus of the movement of the user's finger, and selects the setting items (e.g., "real-time transmission", "polling transmission" and "overseas transmission mode" in the example of FIG. 5C) corresponding to the recognized setting item buttons BT1 or the setting value buttons BT2 as setting target items.

If the setting target items selected by the user include setting items whose settable setting types are different from each other (e.g., the setting item "transmission date and time" whose settable setting type is "2-options of direct and setting" and the setting item "real-time transmission" whose settable setting type is "two-options of OFF/ON"), the same setting value can not be set to these setting target items. Therefore, in this case, the MFP 1 displays a message indicating that these setting target items can not be set collectively on the LCD unit 16, and accepts again selection of setting target items.

If setting target items are appropriately selected by the user, the MFP 1 newly displays the setting value button BT3 (e.g., the two-options button shown in FIG. 5C) for setting the same value to the setting target items. When the user touches one of setting values displayed as the setting value button BT3, the MFP 1 recognizes the setting value designated by the user in accordance with the detection result of the touch panel 17.

Figure 5D:
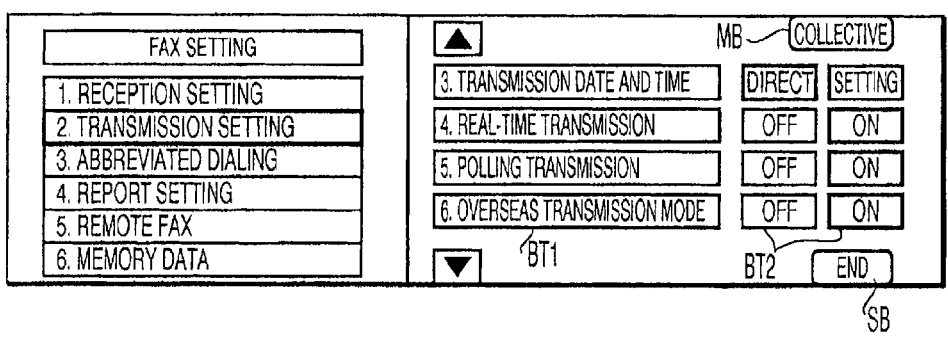

The MFP 1 stores the setting value touched by the user by overwriting the setting in the fields in the "value" $12b6$ corresponding to all of the setting target items. Further, regarding the setting items corresponding to the setting value buttons BT2 for which the same setting value is set by the user collectively, the MFP 1 highlights one of the setting values set by the user on the screen shown in FIG. 5C (see FIG. 5D). Subsequently, the MFP 1 exits the collective setting mode to move to the normal mode. Regarding other points, the setting item change screen shown in FIG. 5D is the same as that shown in FIG. 4E.

As described above, since the setting item change screen configured as shown in FIGS. 4A-4E or FIGS. 5A-5D is displayed on the LCD 16, the user is able to easily select the setting target items to which the user wants ser the same value collectively while viewing the setting items displayed on the setting item change screen. Since the MFP 1 selects the setting target items by detecting the position on the touch panel 17 touched by the user's finger based on the detection result of the touch panel 17, the user is able to intuitively select the setting target items while touching the plurality of setting items on the setting item change screen.

Hereafter, a setting process executed under control of the CPU 11 of the MFP 11 is explained with reference to FIG. 6 which is a flowchart of the setting process. As described in detail below, the settings of the setting items are changed in the setting process in accordance with the user's instructions. The setting process is started when the user instructs the MFP 1 to change the settings of the setting items by operating the operation keys 15 or the touch panel 17.

When the setting process is started, the CPU 11 displays, on the LCD unit 16, the list menu for the major class based on data of the major class $12b1$ stored in the setting item memory $12b$, and accepts a user operation for selecting a desired item in the major class (step S1). If an item in the major class is selected by the user, the CPU 11 displays, on the LCD unit 16, the list menu for the medium class defined by subdividing the major class in accordance with data in the medium class $12b2$ in the setting item memory $12b$, and accepts a user operation for selecting a desired item in the medium class (step S2).

When one of the items in the medium class is selected by the user, the CPU 11 displays, on the LCD unit 16, the list menu for the minor class defined by subdividing the selected item in the medium class in accordance with data in the minor class $12b3$ in the setting item memory $12b$, and accepts a user operation for selecting a desired item in the minor class (step S3).

As described above, the MFP 1 displays the list menus respectively corresponding to the major class, the medium class and the minor class sequentially to accept the user operation for selecting the desired item in each class. Such a configuration enables the user to easily search for a desired setting item.

After the desired item in the minor class is selected by the user in step S3, the CPU 11 displays the setting item change screen shown in FIG. 4A or 5A (step S4). More specifically, the CPU 11 displays, on the right half part of the screen, the setting item buttons BT1 and the setting value buttons BT2 respectively corresponding to a part or all of the setting items included in the selected item of the minor class. The CPU 11 also displays the end button SB on the lower right part of the screen, and the collective setting button on the upper right part of the screen.

Next, the CPU 11 judges whether the collective setting button MB is touched by the user based on the detection result of the touch panel 17 (step S5). If the collective setting button MB is selected by the user (S5: YES), the CPU 11 operates to move the MFP 1 to the collective setting mode and executes a collective setting process shown in FIG. 7 (step S6). In the collective setting process, the setting target items to which the user wants to set the same setting value are selected.

Then, the CPU 11 executes a setting value input process shown in FIG. 8 (step S7). In the setting value input process, the setting value designated by the user is set to the setting target items selected in step S6 collectively. Then, the CPU 11 operates to move the MFP 1 to return to the normal mode, and control proceeds to step S10. The collective setting process and the setting value input process are explained later with reference to FIGS. 7 and 8, respectively.

If the CPU 11 judges that the collective setting button is not touched (S5: NO), the MFP 1 operates in the normal state. In the normal state, the CPU judges which of the setting value buttons BT 1 (i.e., the setting items) displayed on the setting item change screen is touched by the user based on the detection result of the touch panel 17 (step S8).

If one of the setting value button BT2 corresponding to one of the setting items is touched by the user (S8: YES), the CPU 11 changes the setting of the setting item displayed on the setting value button BT2 in accordance with the position touched by the user's finger and the movement of the user's finger, and stores the setting defined when the user's finger is detached from the screen by overwriting the data in the "value" 12b6 in the setting item memory 12b (step S9). Then, control proceeds to step S10.

If the CPU 11 judges that no setting value button BT2 is touched by the user (S8: NO), step S9 is skipped. In this case, control proceeds directly to step S10.

In step S10, the CPU 11 judges whether the end button is displayed on the lower right part of the LCD unit 16 is touched by the user. If the CPU 11 judges that the end button SB is not touched by the user (S10: NO), control returns to step S5 to execute again steps S5-S9. By this configuration, the user is able to change settings of the setting items until the user touches the end button SB.

If the CPU 11 judges that the end button SB is touched by the user (S10: YES), the CPU 11 terminates display of the setting item change screen, and displays the initial screen on the LCD unit 16. By this configuration, the MFP 1 is able to exit the setting process and to execute other processes.

Hereafter, the collective setting process is explained with reference to FIG. 7. The collective setting process is executed under control of the CPU 11 of the MFP 1. As described above, the collective setting process is executed in step S6 of the setting process. In the collective setting process, the same setting value is set to the setting target items collectively when the collective setting button MB is touched by the user and the MFP 1 has moved to the collective setting mode.

As shown in FIG. 4C or 5B, in the collective setting process, the return button RB is displayed at the lower right part of the screen in place of the end button SB which is displayed at the lower right part of the setting item change screen in the normal mode (step S21).

Next, the CPU 11 judges whether the touch panel 17 is touched by the user (S22) The CPU 11 waits until the touch panel 17 is not touched by the user (S22: NO).

If the CPU 11 judges that the touch panel 17 is touched by the user (S22: YES), the CPU 11 judges whether the position touched by the user corresponds to the return button RB (step S23). If the touched position corresponds to the return button RB (S23: YES), control proceeds to step S24 where the CPU 11 moves the onscreen representation back to the previous state displayed before entering to the collective setting mode as shown in FIG. 4A (step S24). In this case, control reruns to step S10 in FIG. 6. Consequently, the MFP 1 exits the collective setting mode and moves to the normal mode.

If the CPU 11 judges that the touched position does not correspond to the return button RB (S23: NO), control proceeds to step S25 where the CPU 11 stores the coordinate of the position touched by the user's finger in the RAM 13. Then, the CPU 11 judges whether the user detaches the user's finger from the touch panel 17 (step S26). If the user's finger does not detached from the touch panel 17 (S26 NO), control returns to step S25 to store the coordinate of the touched position in the RAM 13 again. The CPU 11 repeats step S25 until the CPU 11 judges that the user's finger is detached form the touch panel 17. By this configuration, the CPU 11 sequentially stores, in the RAM 13, the coordinate of the position of the user's finger moving on the touch panel 17.

If the CPU 11 judges that he user's finger is detached from the touch panel 17 (S26: YES), the CPU 11 recognizes a locus of the movement of the user's finger based on the coordinates of the positions touched by the user's finger sequentially stored in the RAM 13. Further, the CPU 11 judges whether the locus surrounds the setting item buttons BT1 or the setting value buttons BT2 as shown in FIG. 4C or FIG. 5B (step S27).

For example, in step S27, the CPU 11 obtains the maximum value and the minimum value of the coordinates stored in the RAM 13, in regard to each of the vertical coordinate axis and the horizontal coordinate axis. Then, the CPU 11 extracts the setting item buttons BT1 or the setting value buttons BT2 lying within both of the range between the maximum value and the minimum value in the vertical axis direction and the range between the maximum value and the minimum value in the horizontal axis direction.

If the setting item buttons BT1 or the setting value buttons BT2 lying within both of the range between the maximum value and the minimum value in the vertical axis direction and the range between the maximum value and the minimum value in the horizontal axis direction are extracted, the CPU 11 judges that the locus of the movement of the user's finger surrounds the setting item buttons BT1 or the setting value button BT2 (step S27: YES).

Next, for each of the setting items corresponding to the setting item buttons BT1 or the setting value buttons BT2 surrounded by the locus of the movement of the user's finger, the CPU 11 reads the setting item name, the settable setting type and the current setting from the "item name" 12b4, the "type" 12b5, the "value" 12b6 of the setting item memory 12b, respectively, and stores the read data temporarily in the RAM 13 (step S28). By this configuration, the setting items to which the same setting should be set collectively is determined temporarily.

Next, the CPU 11 checks the type of each setting item stored in the RAM in step S28 (step S29). Then, the CPU 11 judges whether all of the types are equal to each other (step S30). If al of the types are equal to each other (S30: YES), the CPU 11 terminates the collective setting process. Consequently, the setting items stored in the RAM 13 are finally defined as the setting target items.

On the other hand, if the setting item buttons BT1 or the setting value buttons BT2 lying within both of the range between the maximum value and the minimum value in the vertical axis direction and the range between the maximum value and the minimum value in the horizontal axis direction are not extracted (S27: NO), the CPU 11 displays a message requesting the user to select again the setting items to which the same setting should be set collectively (e.g., "Please select again") on the LCD unit 16 (step S31). Then, the CPU 11 clears the coordinates of the positions of the user's finger in the RAM 13 (step S32). Then, control returns to step S22 to accept again selection of the setting items to which the same setting is set collectively from the user.

If the CPU 11 judges that at least one of the setting items has the type different from the types of the other setting items (S30: NO), it is impossible to set the same setting to these setting items collectively. Therefore, in this case, the CPU 11 displays a message indicating that the collective setting can not be performed for the setting items selected by the user (e.g., a message "The collective setting can not be performed for the setting items.") on the LCD unit 16 (step S33). Then, control returns to step S31.

Thus, whether the all of the types of the setting target items are equal to each other is judged in step S30 based on the data in the "type" 12b5 of the setting item memory 12b stored in the RAM 13. Such a configuration makes it possible to select only the setting items having the same settable setting type, as setting target items.

As described above, in the collective setting process, by only conducting the user operation for surrounding the setting item button BT1 or the setting value buttons BT2 on the right side of the setting item change screen displayed on the LCD unit 16 during the collective setting mode, the setting item buttons BT1 or the setting value buttons BT2 surrounded by the locus of the movement of the user's finger can be set as the setting target items. Therefore, the user is able easily select the setting target items by conducting the intuitive user operation conducted by touching the touch panel to surround desired items.

Hereafter, the setting value input process executed under control of the CPU 11 of the MFP 1 is explained with reference to FIG. 8. As described above, the setting value input process is executed in step S7 of the setting process shown in FIG. 6. The setting value input process is executed to set collectively the setting designated by the user to the setting target items selected by the user through the collective setting process.

When the setting value input process is started, the CPU 11 reads the setting item name and the current setting of one of the setting target items stored in the RAM 13, and displays the read data to arrange a plurality of data of the setting target items from the upper right position of the LCD unit 16 (step S41). Next, the CPU 11 judges whether all of the setting target items have been displayed on the right half part of the LCD unit 16 (step S42). If all of the setting target items have not been displayed (S42: NO), the CPU 11 judges whether another setting target item can be displayed in the remaining space of the right half part of the LCD unit 16 (step S43).

If another setting target item can be displayed in the remaining space in the right half part of the LCD unit 16 (S43: YES), control returns to step S41 whether the CPU 11 reads the setting item name and the current setting of another setting target item form the RAM 13, and displays the read data on the remaining space in the right half part of the LCD unit 16. (step S41).

Until the CPU 11 judges in step S42 that all of the setting target items have been displayed on the right half part of the LCD unit 16 (S42: YES) or the CPU 11 judges in step S43 that another setting target item can not be displayed on the right half part of the LCD unit 16 (S43; NO), step S41 is processed repeatedly. By this configuration, on the right half part of the LCD unit 16, a possible number of setting target items which can be contained within the right half part of the LCD unit 16 are be displayed on the right half part of the LCD unit 16.

It should be noted that steps S41 to S43 are processed to indicate at least a part of the setting target items selected by the user. Therefore, the collective setting process for setting the collectively the setting to all of the setting target items is also executed for the setting items not displayed on the LCD unit 16.

If the CPU 11 judges that all of the setting target items displayed on the right half pail of the LCD unit 16 have been processed (S42: YES) or he CPU 11 judges in step S43 that another setting target item can not be displayed on the right half part of the LCD unit 16 (S43; NO), control proceeds to step S44. In step S44, the CPU 11 grays out the item names and the current settings of the setting target items displayed on the right half part of the LCD 16 to display the setting value button BT3 shown in FIG. 4D or 5C (step S44).

Then, the CPU 11 judges whether the type of the setting target items is "two-options" based on the type of the setting target items stored in the RAM 13 (step S45). If the type of the setting target items is "two-options" (S45: YES), the CPU 11 checks selectable options of the "two-options" (e.g., "direct"/"setting" or "OFF"/"ON"), and displays one setting value button BT3 for selecting one of the options on the grayed out right half part of the LCD unit 16 (step S46). Then, control proceeds to step S48.

If the type of the setting target items is not "two-options" (S45: NO), the type of the setting target items is "five-options". Therefore, in this case, the CPU 11 displays one five-options slider on the grayed out right half part of the LCD unit 16 as the setting value button BT3 (step S47). Then, control returns to step S48.

In step S48, the CPU 11 judges whether the touch panel 17 is touched by the user (the user's finger). If the CPU 11 judges that the touch panel is not touched by the user (S48: NO), step S48 is repeated. That is, the CPU 11 waits until the touch panel 17 is touched by the user.

If the CPU 11 judges that the touch panel 17 is touched by the user (S48: YES), the CPU 11 judges whether the position touched by the user corresponds to the return button RB (step S49). If the position touched by the user does not correspond to the return button RB (S49: NO), the CPU 11 judges whether the position touched by the user corresponds to the setting value button BT3 (step S50).

If the CPU 11 judges that the position touched by the user does not correspond to the setting value button BT3 (S50: NO), control returns to step S48 to judge again whether the touch panel 17 is touched by the user. That is, the CPU 11 waits until the touch panel 17 is touched by the user.

If the CPU 11 judges that the position touched by the user corresponds to the setting value button BT3 (S50: YES), the CPU 11 changes the setting displayed on the setting value button BT3 in accordance with the touched position and the movement of the user's finger on the setting value button BT3, and stores the setting defined when the user's finger is detached from the touch panel by overwriting the data in the "value" 12b6 of the setting item memory 12b (step S51). By this configuration, the setting inputted by the user through the setting value button is set to all of the setting target items collectively.

Thereafter, in order to display the setting item change screen shown in FIG. 4A or 5A as the normal mode, the CPU 11 displays, in the right half part of the LCD unit 16, the setting item buttons BT1 and the setting value buttons BT2 corresponding to at least a part of the setting items contained in one item of the minor class selected in the setting process, and displays the end button SB at the lower right part of the LCD unit 16 and the collective setting button MB at the upper right part of the LCD unit 16 (step S52). Then, the setting value input process terminates. That is, the onscreen representation of the MFP 1 returns to the setting item change screen in the normal mode.

If the CPU 11 judges that the position touched by the user corresponds to the return button RB (S49: YES), the above described step S52 is executed. Then, the setting value input process terminates. By this configuration, if the return button RB is touched by the user, the MFP 1 exits the collective setting mode, and the onscreen representation returns to the setting item change screen in the normal mode.

As described above, according to the first embodiment, setting items to which the user wants to set the same setting collectively are selected by the user from a plurality of setting items as setting target items, and the same setting designated by the user is set for all of the setting target items collectively. That is, the common setting is set to the selected setting items equally. Therefore, the user is able to change the setting of the setting items for which the user wants to change the setting without conducting a troublesome user operation. That is, the user is able to change the settings of desired setting items by a simple user operation.

Second Embodiment

Hereafter, an MFP according to a second embodiment is described with reference to FIGS. 9 and 10.

In the first embodiment, in order to set the setting target items to which the user wants to set the same setting collectively, the user moves the user's finger touching the touch panel 17 to surround the desired setting item buttons BT1 or the desired setting value buttons BT2 displayed in the LCD unit 16. By contrast, according to the second embodiment, the user is allowed to select desired setting items to which the user wants to set the same setting collectively, by moving the user's finger touching the touch panel 17 to cross the setting item buttons BT1 or the setting value buttons BT2 displayed on the LCD unit 16.

The setting item change screen according to the second embodiment is substantially the same as that of the first embodiment excepting a locus of the movement of the user's finger. That is, the second embodiment corresponds to a variation of the collective setting process shown in FIG. 7. Therefore, in the following, the explanations focus on the features of the second embodiment. The drawings illustrating various features of the first embodiment are also referred to for explanations of the features of the second embodiment.

Figure 9:
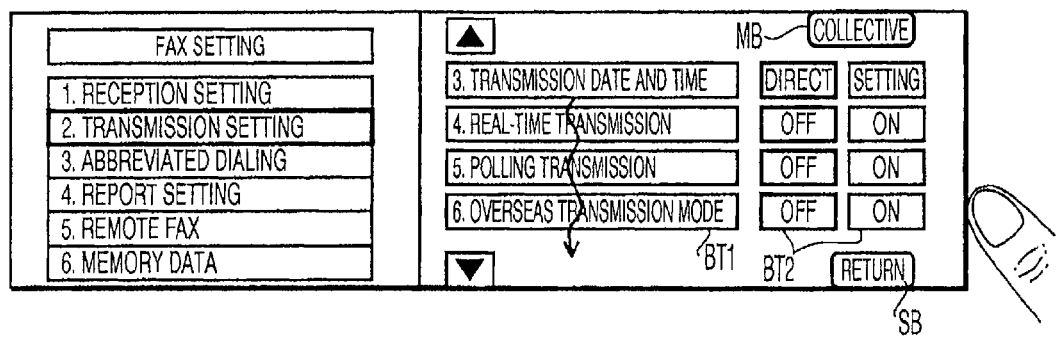
FIG. 9 is an example of a setting item change screen displayed during a collective setting mode according to a second embodiment.

FIG. 9 is an example of the setting item change screen displayed during the collective setting mode according to the second embodiment. The setting item change screen shown in FIG. 9 illustrates the situation where the MFP 1 accepts selection of setting target items corresponding to the "real-time transmission", "polling transmission" and "overseas transmission" selected from the setting items associated with the "function setting" in the major class 12b1, "FAX setting" in the medium class and the "transmission setting" in the minor class 12b3. Contents displayed on the screen of FIG. 9 is the same as that displayed on the screen of FIG. 5B.

As shown in FIG. 9, when the user moves the user's finger touching the touch panel 17 to cross the setting item buttons BT1 or the setting value buttons BT2 corresponding to desired setting items to which the user wants to set the same setting collectively, the setting item buttons BT1 or the setting value buttons BT2 located on the locus of the movement of the user's finger (e.g., "real-time transmission", "polling transmission" and "overseas transmission" in the example shown in FIG. 9) are selected as setting target items. Then, the screen shown in FIG. 5C is displayed to accept a user operation for setting the setting value to be set to the setting target items collectively.

Although in the example shown in FIG. 9 the setting items each of which has the type "two-options of OFF or ON" is selected as a setting target item, substantially the same onscreen representation as that of FIG. 9 is provided when the setting items each of which has the type "five-options slide" are selected as the setting target items.

Hereafter, the collective setting process according to the second embodiment is explained with reference to FIG. 10. FIG. 10 is a flowchart illustrating the collective setting process executed under control of the CPU 11 of the MFP 1. In FIG. 10, to steps which are substantially the same as those of the collective setting process according to the first embodiment, the same step numbers are assigned, and explanations thereof will not be repeated. The points of difference with respect to the collective setting process according to the first embodiment (FIG. 7) are that steps S27 and S28 of the collective setting process of FIG. 7 are replaced with steps S61 and S62.

In step S61, the CPU 11 recognizes the locus of the movement of the user's finger based on the coordinates of the positions of the user's finger sequentially stored in the RAM 13, and judges whether the locus crosses the setting item button BT1 or the setting value button BT2 displayed on the right half part of the LCD unit 16.

If the locus of the movement of the user's finger touching the touch panel 17 crosses the setting item button BT1 or the setting value button BT2 (S61: YES), the CPU 11 reads the setting item names, the settable setting types and the current settings of the setting items corresponding to the setting item buttons BT1 or the setting value buttons BT2 which the locus of the user's finger crosses, from the "value" 12b6, the "type" 12b5, the "setting item name" 12b4 of the setting item memory 12b, and stores temporarily the read data in the RAM 13 (step S62). Consequently, the setting target items are determined temporarily.

Next, as in the case of the first embodiment, the CPU 11 recognizes the types of each setting target item stored in the RAM 13 in step S62 (step S29), and judges whether all of the types of the setting target items are equal to each other (step S30). If al of the types of the setting target items are equal to each other (S30: YES), the CPU 31 terminates the collective setting process. Consequently, the setting items stored in the RAM 13 are selected finally as the setting target items.

If the CPU 11 judges that the locus of the movement of the user's finger touching the touch panel 17 does not cross the setting item button BT1 or the setting value button BT2 (S61: NO), control proceeds to step S31 where the CPU 11 displays a message requesting the user to select again the setting items to which the same setting should be set collectively (e.g., "Please select again") on the LCD unit 16 (step S31). Then, the CPU 11 clears the coordinates of the positions of the user's finger in the RAM 13 (step S32). Then, control returns to step S22 to accept again selection of the setting items to which the same setting is set collectively from the user.

According to the second embodiment, the user is able to select the setting target items by only moving the user's finger touching the touch panel 17 to cross the setting item buttons BT1 or the setting value buttons BT2 corresponding to desired setting items to which the user wants to set the same setting collectively. That is, the user is able to select the setting target items through an intuitive user operation performed by moving the user's finger to cross desired items.

Third Embodiment

Hereafter, an MFP according to a third embodiment is described with reference to FIGS. 11A-11G and 12.

In the first or second embodiment, in order to set the setting target items to which the user wants to set the same setting collectively, the user moves the user's finger touching the touch panel 17 to surround or cross the desired setting item buttons BT1 or the desired setting value buttons BT2 displayed in the LCD unit 16. By contrast, according to the third embodiment, the MFP 1 is configured to display, on the right half part of the LCD unit 16, the setting target items selected by the user from among the setting items displayed on the left half part of the LCD unit 16 as the setting item buttons BT1 or the setting value buttons BT2, and to allow the user to set the setting value to the setting target items to which the user wants to set the same setting collectively.

The third embodiment corresponds to a variation of the collective setting process of the above described embodiments. Therefore, in the following, the explanations focus on the features of the third embodiment. The drawings illustrating various features of the first and second embodiments are also referred to for explanations of the features of the third embodiment.

FIGS. 11A-11G illustrate transitions of the onscreen representation of the setting item change screen according to the third embodiment. The setting item change screen shown in FIGS. 11A-11G illustrate the situation where the MFP 1 accepts selection of setting target items corresponding to the "real-time transmission" and "polling transmission" selected from the setting items associated with the "function setting" in the major class 12b1, "FAX setting" in the medium class and the "transmission setting" in the minor class 12b3.

As in the case of the screen shown in FIG. 5A, when the "function setting", "FAX setting" and "transmission setting" are selected by the user on the list menus of the major class, the medium class and the minor class, respectively, in order to change the settings of the setting items, the MFP 1 displays, on the left half part of the LCD unit 16, a menu for the minor class, and displays, on the right half part of the LCD unit 16, a plurality of setting item buttons BT1 representing the names of the setting items "transmission date and time", "real-time transmission", "polling transmission" and "overseas transmission" associated with the "transmission setting" of the minor class and the setting value buttons BT2 respectively corresponding to the plurality of displayed setting item buttons BT1 (see FIG. 11A).

The MFP 1 highlights one of the two-options of the setting value button BT2 in accordance with data stored in the "value" 12b6 of the item name 12b4 corresponding to each setting item. Further, the MFP 1 displays the end button SB and the collective setting button MB on the screen. When the collective setting button is touched by the user, the MFP 1 moves to the collective setting mode.

If the MFP1 moves to the collective setting mode, the MFP 1 moves the setting item buttons BT1 and the setting value buttons BT2 corresponding to the setting items displayed on the right half part of the LCD unit 16 to the left half part of the LCD unit 16. In this case, the MFP 1 displays blank space on the right half part of the LCD unit 16 (see FIG. 11B). In the blank space on the right half part of the LCD unit 16, the MFP 1 displays the setting item buttons BT1 and the setting value buttons BT2 corresponding to the setting target items which are selected by the user from the setting items to set the same setting collectively.

Further, as shown in FIG. 11B, the MFP 1 displays the return button RB in the lower right part of the screen of the LCD unit 16. When the user touched the return button RB, the touch panel 17 judges that the return button RB is operated by the user. As a result, the MFP 1 exits the collective setting mode to return to the normal mode. In this case, the MFP 1 returns the onscreen representation to the state shown in FIG. 11A. The MFP 1 displays constantly the return button RB during the collective setting mode. Therefore, the user is able to move the MFP 1 from the collective setting mode back to the normal mode at any desired time.

When the user touches one of the setting item buttons BT1 corresponding to the setting items included in the left half part of the LCD unit 16 and moves the user's finger touching the selected button to the right half part of the screen as shown in FIG. 11C, the touch panel 17 detects the movement of the user's finger. Then, based on the detection result of the touch panel 17, the MFP 1 judges that the setting item corresponding to the setting item button BT1 touched by the user is selected as the setting target item. Then, as shown in FIG. 11D, the MFP 1 displays the setting item button BT1 and the setting value button BT corresponding to the setting target item on the right half part of the LCD unit 16.

When the user touches the setting item button BT1 corresponding to another setting item included in the left half part of the LCD unit 16 and moves the user's finger touching the setting item button BT1 to the right half part of the LCD unit 16 as shown in FIG. 11E, the MFP 1 judges that the setting item newly touched by the user is also selected as the setting target item. Then, as shown in FIG. 11F, the MFP 1 displays the setting item button BT1 and the setting value button BT2 corresponding to the newly selected setting item on the right half part of the LCD unit 16 together with the setting item button BT1 and the setting value button BT2 which have been already displayed on the right half part of the LCD unit 16.

When the user repeats such a selection operation of touching a desired setting item button BT1 and then moving the user's finger to the right half part of the LCD unit 16, the MFP 1 adds successively the setting item button BT1 and the setting value button BT2 corresponding to the selected setting item to the right half part of the LCD unit 16.

In response to display of the setting item button BT1 and the setting value button BT2 corresponding to one or more setting item on the right half part of the LCD unit 16, the MFP 1 displays a collection end button MSB in the lower right part of the LCD unit 16. When the user touches the collection end button MSB, the touch panel 17 judges that the collection end button MSB is operated by the user. As a result, the MFP 1 judges that the user ends the selection operation for selecting the setting target items, and then displays a screen for accepting the setting which the user wants to set to the setting target items collectively (see FIG. 11G).

If a setting item whose settable setting type is different from settable setting types of the other setting items is included in the setting target items at the time when the collection end button MSB is operated by the user, it is impossible to set the same setting to all of the setting target items collectively. Therefore, in this case, the MFP 1 displays a message indicating that the collective setting can not be performed for the setting items selected by the user on the LCD unit 16. Then, the MFP 1 again accepts the selection operation for selecting setting items to which the user wants to set the same setting collectively.

As shown in FIG. 11G, on the screen for accepting the user operation of designating the setting which the user wants to set to the setting target items collectively, the MFP 1 newly displays the setting value button BT3 (two-options button) for designating the setting to be set to the setting target items. When the user touches one of the two options displayed as the setting value button BT3, the touch panel 17 detects the setting designated by the user through the setting value button BT3.

The MFP 1 overwrites the "value" 12b6 corresponding the item name 12b4 of each of the setting target items with the setting detected by the touch panel 17. Then, the MFP 1 displays the setting item change screen of FIG. 11A in which the newly stored setting is reflected.

Although, in the example shown in FIGS. 11A-11G, the setting target items is selected from the setting items whose settable setting types are "two-options of OFF and ON", substantial the same transitions of the onscreen representation is performed by the MFP 1 when the setting target item is selected from the setting items whose settable setting type are another type, such as "five-options slide".

Hereafter, an MFP according to a third embodiment is described with reference to FIG. 12.

The third embodiment corresponds to a variation of the collective setting process shown in FIG. 7. Therefore, in the following, the explanations focus on the features of the third embodiment. The drawings illustrating various features of the first and second embodiments are also referred to for explanations of the features of the third embodiment.

Figure 12:
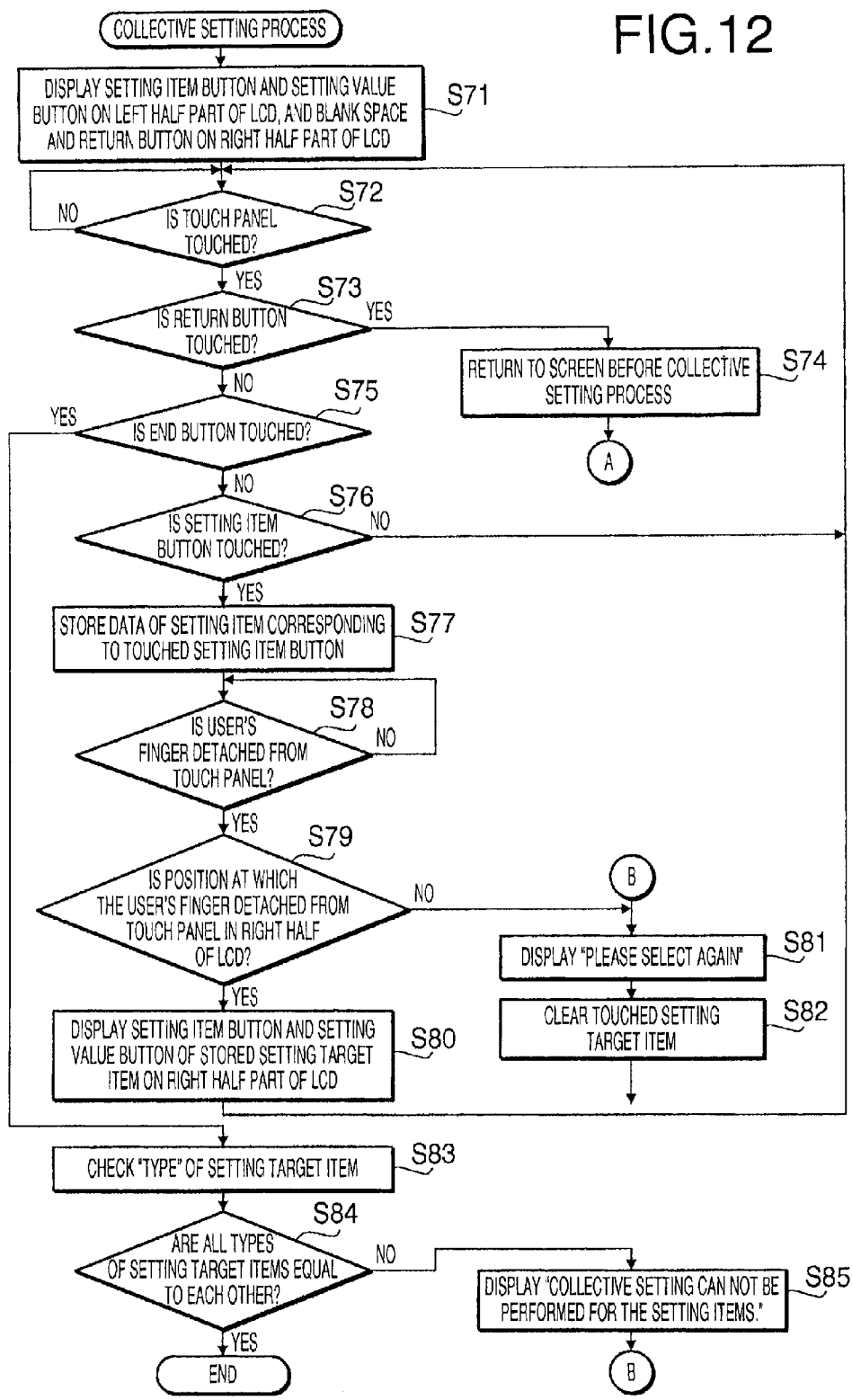
FIG. 12 is a flowchart illustrating a collective setting process executed by the MFP according to the third embodiment.

FIG. 12 is a flowchart illustrating the collective setting process according to the third embodiment executed under control of the CPU 11 of the MFP 1.

When the collective setting process is started, the CPU 11 displays, on the left half part of the LCD unit 16, the setting item buttons BT1 and the setting value buttons BT2 corresponding to the setting items associated with the item of the minor class selected through the setting process shown in FIG. 6, and displays, on the right half part of the LCD unit 16, blank space and the return button RB2 (step S71).

Then, the CPU 11 judges whether the touch panel 17 is touched by the user (step S72). The CPU 11 waits until the touch panel 17 is touched by the user (S72: NO). If the touch panel 17 is touched by the user (S72: YES), the CPU 11 judges the position touched by the user's finger corresponds to the return button RB (step S73). If the touched position corresponds to the return button RB (S73: YES), the CPU 11 returns the onscreen representation to the state formed before moving to the collective setting mode (see FIG. 11A) (step S74). Then, control returns to step S10 of the setting process shown in FIG. 6. Consequently, the MFP 1 exits the collective setting mode to move to the normal mode.

If the CPU 11 judges that the touched position does not correspond to the return button RB (S73: NO), the CPU 11 judges whether the touched position corresponds to the collection end button MSB (step S75). If the touched position does not correspond to the collection end button MSB (S75: NO), control proceeds to step S76 where the CPU 11 judges whether the touched position corresponds to one of the setting item button BT1.

If the collection end button MSB is not displayed on the setting item change screen as shown in FIG. 11B, the CPU 11 judges that the touched position does not correspond to the collection end button in step S75 (S75: NO). In this case, control proceeds to step S76.

If the CPU judges in step S76 that the touched position does not correspond to any of the setting item buttons BT1 (S76: NO), control returns to step S72 to again wait until the touch panel 17 is touched by the user.

If the CPU judges in step S76 that the touched position corresponds to one of the setting item buttons BT1 (S76: YES), the CPU 11 defines the setting item of the touched setting item button BT1 as the setting target item, reads the setting item name, the settable setting type, and the current setting of the setting target item from the "value" 12b6, the "type" 12b5, the item name 12b4 in the setting memory 12b, and then stores temporarily the read data in the RAM 13 (step S77).

Next, the CPU 11 judges whether the user detaches the user's finger from the touch panel 17 based on the detection result of the touch panel 17 (step S78). The CPU 11 waits until the user's finger is detached from the touch panel 17 (S78: NO). if the CPU 11 judges in step S78 that the user's finger is detached from the touch panel 17 (S78: YES), the CPU 11 judges whether the position at which the user's finger is detached lies in the right half part of the LCD unit 16 based on the detection result of the touch panel 17 (step S79).

If the CPU 11 judges that the position at which the user's finger is detached lies in the right half part of the LCD unit 16 (S79: YES), the CPU 11 displays the setting item button BT1 and the setting value button BT2 corresponding to the setting target item stored in the RAM 13 on the right half part of the LCD unit 16 (step S80). Then, control returns to step S72 to again wait the touch panel 17 is touched by the user.

If the CPU 11 judges that the position at which the user's finger is detached does not lie in the right half part of the LCD unit 16 (S79: NO), the CPU 11 displays a message requesting the user to select again the setting items to which the same setting should be set collectively on the LCD unit 16 (step S88). Then, the CPU 11 clears the information (e.g., the setting item name, the type and the current setting) concerning the setting target item stored in the RAM 13 (step S82). Then, control returns to step S72. By this configuration, by touching the setting item button BT1 displayed on the left half part of the LCD unit 16 and thereafter detaching the user's finger in the position other than the right half part of the LCD unit 16, the MFP 1 operates not to select the setting item corresponding to the touched setting item button BT1. In this case, the MFP 1 is able to accept instructions from the user.

If the CPU 11 judges that the touched position corresponds to the collection end button in step S75 (S75: YES), the CPU 11 check the settable setting types of all of the setting target items stored in the RAM 13 (step S83). Then, the CPU 11 judges whether the types of all of the setting target items are equal to each other (step S84). If all of the types of the setting target items are not equal to each other (S84: NO), it is impossible to set the same setting to all of the setting target items collectively. Therefore, in this case, the CPU 11 displays a message indicating that the collective setting can not be preformed for the setting items selected by the user (e.g., a message "The collective setting can not performed for the setting items.") on the LCD unit 16 (step S85). Then, control returns to step S81. Then, the MFP 1 again accepts instructions from the user.

If the CPU 11 judges that the types of all of the setting target items are equal to each other (S84: YES), the CPU 11 terminates the collective setting process. Consequently, the setting items stored in the RAM 13 is finally defined as the setting target items, and the setting designated by the user through the setting value input process shown in FIG. 8 is set to all of the setting target items collectively.

As described above, according to the third embodiment, the MFP 1 displays, on the right half part of the LCD unit 16, the setting items which are selected by the user from the plurality of setting items displayed as the setting item buttons BT1 and the setting value buttons BT2 on the left half part of the LCD unit 16. Further, the MFP 1 collectively sets the same setting to the setting items displayed on the right half part of the LCD unit 16.

Therefore, the user is able to easily select the setting items to which the user wants to set the same setting collectively while visibly checking the selected setting items on the left half part of the LCD unit 16. Even if the setting item button BT1 of the setting item to which the user wants to set the same setting collectively is displayed on the left half part of the LCD unit 16, the user is able to select such a setting item as a setting target item.

Fourth Embodiment

Hereafter, a fourth embodiment is described with reference to FIG. 13.

In the above described embodiments, the setting item change screen is displayed on the LCD unit 16 provided on the MFP 1, and the user is able to change the settings of the setting items collectively by touching the touch panel 17 provided on the LCD panel of the LCD unit 16. By contrast, according to the fourth embodiment, a setting item change screen is displayed on an LCD unit 416 connected to a PC 400, and the user is allowed to operate a touch pen 417 on the setting item change screen to set pall of the setting items of an MFP 300 collectively.

Figure 13:
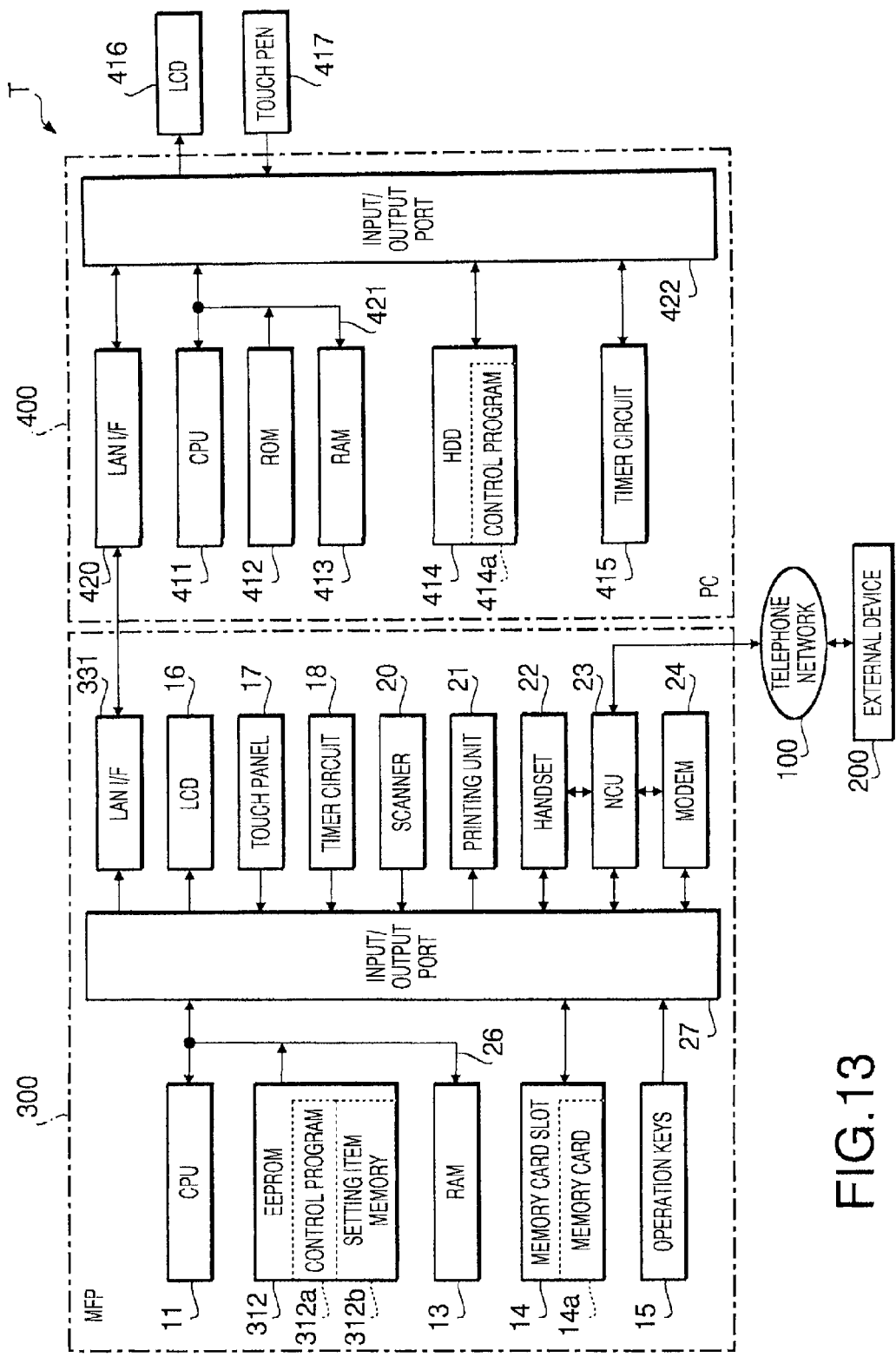
FIG. 13 is a block diagram of a control system according to a fourth embodiment.

In FIG. 13, to elements which are substantially the same as those of the above described embodiments, the same reference numbers are assigned, and explanations thereof will not be repeated. In the following, explanations of the fourth embodiment focus on the features of the fourth embodiment.

FIG. 13 is a block diagram of a control system T according to the fourth embodiment. The control system T includes the MFP 300 and the PC 400. The feature of the MFP 300 is that the MFP 300 has an EEPROM 312 in place of the EEPRON 12, and has an LAN interface 331.

The EEPROM 312 stores various types of data including a control program 312a and fixed value data which can be maintained in a power of state of the EEPROM 312. The control program 312a includes a program for controlling communication between the PC 400 and the MFP 300 when the PC 400 operates to change the settings of the setting items of the MFP 300.

The EEPROM 312 also stores a setting item memory 312b. the setting item memory 312b is a memory for storing data of setting items defining the operation conditions of the function of the MFP 300. The setting item memory 312b has the same data structure as that of the setting item memory 12b shown in FIG. 3).

The LAN interface 331 interfaces the MFP 300 with the PC 400. That is, the LAN interface 331 controls data transmission and reception with respect to the PC 400. The LAN interface 331 is connected to the internal components of the MFP 1 via the input/output port 27.

The MFP 300 further includes a memory card slot 14 to which a memory card 14a is detachably attachable.

The PC 400 includes, as main components, a CPU 411, a ROM 412, a RAM 413, an HDD (hard disk drive) 414, a timer circuit 415, and a LAN interface 420. The CPU 411, the ROM 412 and the RAM 413 are connected to each other via a bus 421. The HDD 414, the LAN interface 412 and the bus 421 are connected to each other via an input/output interface 422. The LCD unit 416 and the touch pen 417 are connected to the input/output interface 422, and exchange data with the internal components of the PC 400.

The CPU 411 controls functions of the PC 400 in accordance with programs stored in the ROM 412 or in the HDD 414 or control signals from the various components connected to the input/output port 422.

The ROM 412 stores various types of data including control programs to be executed by the CPU 411 and fixed value data. The RAM 413 is used as work memory for storing various types of data used to execute the functions of the PC 400.

The HDD 414 stores the control program 414a to be executed by the CPU 411. The control program 414a includes shown in FIGS. 4-8 as flowcharts. When the CPU 411 executes these programs, the setting item change screen shown in FIG. 4 or 5 is displayed on the LCD unit 416 connected to the PC 400. By touching the various buttons provided on the setting item change screen with the touch pen 417, the user is able to change the settings of the desired setting items of the MFP 300 without conducting a troublesome user operation.

The LAN interface 420 interfaces the PC 400 with the MFP 300. That is, the LAN interface 420 controls data transmission and reception with respect to the MFP 300.

The LCD unit 416 includes an LCD panel (not shown). On the LCD panel of the LCD unit 416, various information including menus and operation statuses is displayed in accordance with the operations by the touch pen 417.

The touch pen 417 is an input device configured such that when the touch pen 417 touches the LCD panel of the LCD unit 416, the touch pen 417 detects a coordinate on the LCD panel touched by the touch pen 417.

The CPU 411 recognizes user operations conducted on the setting item change screen displayed on the LCD unit 416 based on the coordinates detected by the touch pen 417. The CPU 411 also accepts selection of the setting target items to which the user wants to set the same setting collectively, and accepts the setting to be set to all of the setting target items selected by the user.

As described above, according to the fourth embodiment, the user is able to select the setting target items from among the setting items of the MFP 300 through the PC 400. Further, the setting designated by the user through the PC 400 is set to all of the setting target items collectively. That is, the user is able to change the settings of the desired setting items collectively by a simple user operation. Therefore, as in the case of the first embodiment, the user is able to change the settings of the desired setting items collectively without conducting the troublesome user operation.

Although the present invention has been described in considerable detail with reference to certain preferred embodiments thereof other embodiments are possible.

Figures 14A, 14B:
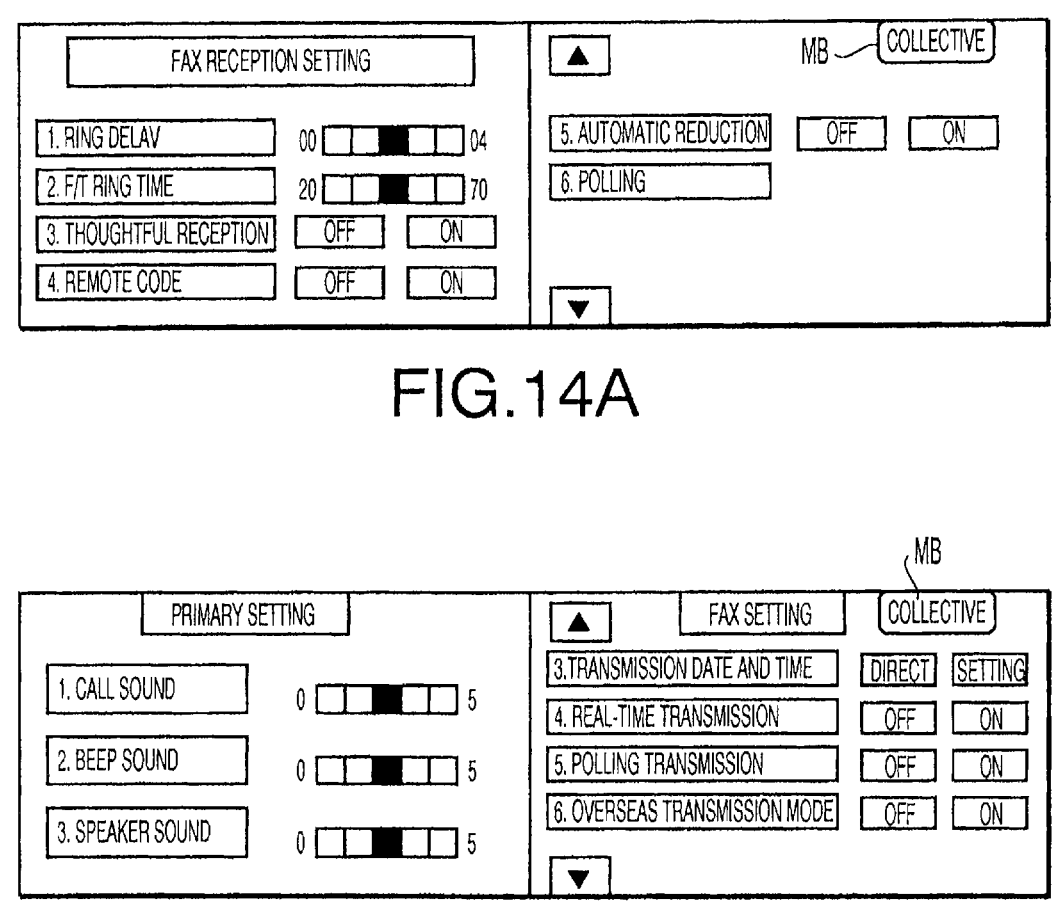

In the above described embodiments, a plurality of setting items are displayed on the left half part or the right half part of the LCD unit 16 and the setting target items are selected from the displayed setting items. However, as shown in FIG. 14A, a plurality of setting items contained in an item of the minor class may be displayed on the left half part and the right half part of the LCD unit 16. In this case, the user may be allowed to select the setting target items from the setting items displayed on the left half part and the right half part of the LCD unit 16.

Alternatively, as shown in FIG. 14B, a plurality of setting items contained in an item of the minor class on the left part of the LCD unit 16 and a plurality of setting items contained in another item of the minor class on the right half part of the LCD unit 16. In this case, the user may be allowed to select the setting target items from among the setting items displayed on the left half part and the right half part of the LCD unit 16.

Regarding the latter case, the user is able to set the same setting to the setting items belonging to different minor class items.

In the case where the variation shown in FIG. 14A or 14B is applied to the third embodiment, the MFP 1 may form a display area in which the selected setting items are displayed.

In the above described embodiments, the setting target items are selected through use of the touch panel 17 or the touch pen 417 from among a plurality of setting items displayed on the LCD unit 16 or the LCD unit 416. However, various types of inputting devices, such as a mouse, a keyboard or operation keys, may be used to select the setting target items.

In the first to third embodiments, the user operates the touch panel 17 with the user's finger. However, various types of pointing tools, such as a pen, may be used to operate the touch panel 17.

In the above described first and second embodiments, when the user moves the user's finger to surround or cross the setting item buttons BT1 or the setting value buttons BT2 displayed on the setting item change screen of the LCD unit 16, the setting items corresponding to the setting item buttons BT1 or the setting value buttons BT2 surrounded by the locus of the user's finger or crossed by the locus of the user's finger are selected as the setting target items. However, in another embodiment, the MFP may be configured such that when the user moves the user's finger to surround or cross the setting item buttons BT1, the setting items corresponding to the setting item buttons BT1 surrounded by the locus of the user's finger or crossed by the locus of the user's finger are selected as the setting target items. Alternatively, the MFP may be configured such that when the user moves the user's finger to surround or cross the setting value buttons BT2, the setting items corresponding to the setting value buttons BT2 surrounded by the locus of the user's finger or crossed by the locus of the user's finger are selected as the setting target items.

In the above described second embodiment, when the user moves the user's finger to cross the setting item buttons BT1 or the setting value buttons BT2, the setting items corresponding to the setting item buttons BT1 or the setting value buttons BT2 crossed by the locus of the user's finger are selected as the setting target items. However, the MFP 1 may be configured such that when the user points to two positions with the user's finger (or a pointing tool) so that desired setting item buttons BT1 or desired setting items BT2 are get caught between the two points, the setting items corresponding to the desired setting item buttons BT1 or the desired setting items BT2 located between the two points are selected as the setting target items. Such a configuration enables the user to select the setting items to which the user wants to set the same setting collectively through an intuitive user operation of pointing two points to catch the desired setting items between the two points.

In the above described third embodiment, when the user touches the setting item button BT1 displayed on the setting item change screen of the LCD 16 and moves the user's finger touching the setting item button BT1 to the right half part of the screen, the setting item button BT1 touched by the user's finger is selected as the setting target item. However, the MFP may be configured such that when the user touched the setting value button BT2 displayed on the setting item change screen and moves the user's finger touching the setting value button BT2 to the right half part of the screen, the setting value button BT2 touched by the user's finger is selected as the setting target item.

In the above described third embodiment, during the collective setting mode, a plurality of setting items are displayed on the left half part of the setting item change screen and the setting target items selected by the user are displayed on the right half part of the setting item change screen. However, the position of a display area in which the setting items are displayed and the position of a display area in which the setting target items selected by the user are displayed are not limited to the example in the third embodiment.

In the above described fourth embodiment, the control program 414*a* includes the programs shown in FIGS. 6-8. However, the control program 414*a* may include the program of the collective setting process shown in FIG. 10 or 12 in place of the program of the collective setting process shown in FIG. 7.

In the above described embodiment, the various functions for setting the same setting to a plurality of setting items of the MFP 1 (or the MFP 400) collectively are implemented on the MFP 1 (or the MFP 400). However, the various functions for setting the same setting to a plurality of setting items in a control device (or in a control system) may be implemented on the control device (or the control system).

What is claimed is:

1. A control device for making settings, comprising:
   a display configured to display a plurality of setting items regarding the control device and a plurality of setting value buttons corresponding to the plurality of setting items,
   wherein each setting value button of the plurality of setting value buttons represents a setting for a corresponding one of the plurality of setting items;
   a setting item selection unit configured to select a group of setting items comprising a selectable number of setting items to which a same setting is to be set simultaneously, from among the plurality of setting items displayed on the display, based on externally inputted instructions,
   wherein the display is configured to display a new setting value button in response to the setting item selection unit selecting the group of setting items, the new setting value button representing settings for the setting items in the group of setting items;
   a setting value accepting unit configured to accept a single setting to be set equally to the setting items in the group of setting items; and
   a setting unit configured to set the single setting accepted through the setting value accepting unit to all of the setting items in the group of setting items simultaneously.

2. The control device according to claim 1, wherein the setting item selection unit is configured to select the group of setting items comprising the selectable number of setting items from setting items having a common setting type.

3. The control device according to claim 2, further comprising
   a storage unit configured to store a settable setting type for each of the plurality of setting items,
   wherein the setting item selection unit is configured to refer to settable setting types stored in the storage unit to determine the setting items having the common setting type.

4. The control device according to claim 2, further comprising:
   a position detection unit configured to detect a position externally designated on a screen of the display unit; and
   a display controller configured to control the display to display setting items having a common settable setting type selected from the plurality of setting items, wherein:
the externally inputted instructions are provided as detection results of the position detection unit; and
the setting item selection unit is configured to select, as the group of setting items comprising the selectable number of setting items to which same setting should be set, all or a portion of displayed setting items displayed on the display.

5. The control device according to claim 4, further comprising
a locus detection unit configured to detect a locus of contact on the display as the externally designated position detected by the position detection unit,
wherein the setting item selection unit is configured such that when the locus detected by the locus detection unit surrounds at least a portion of the displayed setting items, the setting item selection unit is configured to select, as the group of setting items comprising the selectable number of setting items to which the same setting is to be set, the at least a portion of the displayed setting items surrounded by the locus.

6. The control device according to claim 4, further comprising
a locus detection unit configured to detect a locus of contact on the display as the externally designated position detected by the position detection unit,
wherein the setting item selection unit is configured such that when the locus detected by the locus detection unit crosses at least a portion of the displayed setting items, the setting item selection unit is configured to select, as the group of setting items comprising the selectable number of setting items to which same setting is to be set, the at least a portion of the displayed setting items crossed by the locus.

7. The control device according to claim 4, wherein:
the position detection unit is configured to detect two points externally designated on the display unit; and
the setting item selection unit is configured such that when at least a portion of the displayed setting items are disposed between the two points detected by the position detection unit, the setting item selection unit is configured to select, as the group of setting items comprising the selectable number of setting items to which same setting is to be set, the at least a portion of the displayed setting items disposed between the two points.

8. The control device according to claim 4, further comprising
a locus detection unit configured to detect a locus of contact on the display as the externally designated position detected by the position detection unit,
wherein the setting item selection unit is configured such that when the locus detected by the locus detection unit indicates that at least one setting item of the displayed setting items is moved from a first position to a second position, the setting item selection unit is configured to select, as one of the setting items in the group of setting items comprising the selectable number of setting items to which same setting is to be set, the at least one setting item moved from the first position to the second position.

9. The control device according to claim 4, wherein
the display comprises a display panel;
the position detection unit comprises a touch panel provided on a display surface of the display panel, the touch panel configured to recognize a position touched by or approached by a pointing tool as the externally designated position; and
the display controller is configured to control the display such that setting items having a common settable setting type selected from the plurality of setting items are displayed on the display panel.

10. The control device according to claim 2, further comprising:
a position detection unit configured to detect a position externally designated on a screen of the display; and
a display controller configured to control the display to:
divide the screen of the display into a plurality of areas,
display setting items having a common settable setting type selected from the plurality of setting items in a first area of the divided areas on the screen; and
display all or a portion of the displayed setting items selected from the displayed setting items based on the externally designated position detected by the position detection unit, in a second area of the plurality of divided areas different from the first area,
wherein the setting item selection unit is configured to select, as the group of setting items comprising the selectable number of setting items to which same setting is to be set, the all or the portion of the displayed setting items displayed in the second area.

11. The control device according to claim 1,
wherein the new setting value button represents the settings for the setting items in the group of setting items as a single setting item for setting the single setting, and
wherein the setting value accepting unit is configured to accept the single setting in response to the single setting being set using the single setting item represented by the new setting value button, and
wherein the setting unit is configured to set the single setting accepted through the setting value accepting unit to all of the setting items in the group of setting items simultaneously in response to the single setting being set using the single setting item represented by the new setting value button.

12. A method to be implemented on a control device for making settings and comprising a display, the method comprising the steps of:
displaying a plurality of setting items regarding the control device on the display;
displaying a plurality of setting value buttons corresponding to the plurality of setting items, wherein each setting value button of the plurality of setting value buttons represents a setting for a corresponding one of the plurality of setting items;
selecting a group of setting items comprising a selectable number of setting items to which a same setting is to be set simultaneously, from among the plurality of setting items displayed on the display, based on externally inputted instructions;
displaying a new setting value button in response to selecting the group of setting items, wherein the new setting value button represents settings for the setting items in the group of setting items;
accepting a single setting to be set equally to the setting items in the group of setting items; and
setting the accepted single setting to all of the setting items in the group of setting items simultaneously.

13. The method according to claim 12, wherein, in the step of selecting, the group of setting items comprising the selectable number of setting items is selected from setting items having a common setting type.

14. The method according to claim 13, wherein the step of selecting comprises the step of referring to settable setting types stored in the control device to determine the setting items having the common setting type.

15. The method according to claim 12,
wherein the new setting value button represents the settings for the setting items in the group of setting items as a single setting item for setting the single setting, and
wherein accepting the single setting occurs in response to the single setting being set using the single setting item represented by the new setting value button, and
wherein setting the accepted single setting to all of the setting items in the group of setting items simultaneously occurs in response to the single setting being set using the single setting item represented by the new setting value button.

16. A computer readable medium storing computer readable instruction thereon, which, when executed by a processor of a control device comprising a display, configures the processor to perform the steps of:
displaying a plurality of setting items regarding the control device on the display;
displaying a plurality of setting value buttons corresponding to the plurality of setting items, wherein each setting value button of the plurality of setting value buttons represents a setting for a corresponding one of the plurality of setting items;
selecting a group of setting items comprising a selectable number of setting items to which a same setting is to be set simultaneously, from among the plurality of setting items displayed on the display, based on externally inputted instructions;
displaying a new setting value button in response to selecting the group of setting items, wherein the new setting value button represents settings for the setting items in the group of setting items;
accepting a single setting to be set equally to the setting items in the group of setting items; and
setting the accepted single setting to all of the setting items in the group of setting items simultaneously.

17. The computer readable medium according to claim 16, wherein, in the step of selecting, the group of setting items comprising the selectable number of setting items is selected from setting items having a common setting type.

18. The computer readable medium according to claim 17, wherein the step of selecting comprises the step of referring to settable setting types stored in the control device to determine the setting items having the common setting type.

19. The computer readable medium according to claim 16,
wherein the new setting value button represents the settings for the setting items in the group of setting items as a single setting item for setting the single setting, and
wherein accepting the single setting occurs in response to the single setting being set using the single setting item represented by the new setting value button, and
wherein setting the accepted single setting to all of the setting items in the group of setting items simultaneously occurs in response to the single setting being set using the single setting item represented by the new setting value button.

20. A control system for making settings, comprising:
a display configured to display a plurality of setting items regarding a control device in the control system and a plurality of setting value buttons corresponding to the plurality of setting items;
a setting item selection unit configured to select a group of setting items comprising a selectable number of setting items to which a same setting should be set simultaneously, from among the plurality of setting items displayed on the display, based on externally inputted instructions,
wherein the display is configured to display a new setting value button in response to the setting item selection unit selecting the group of setting items, the new setting value button representing settings for the setting items in the group of setting items;
a setting value accepting unit configured to accept a single setting to be set equally to the setting items in the group of setting items; and
a setting unit configured to set the single setting accepted through the setting value accepting unit to all of the setting items in the group of setting items simultaneously.

21. The control system according to claim 20, wherein the setting item selection unit is configured to select the group of setting items comprising the selectable number of setting items from setting items having a common setting type.

22. The control system according to claim 21, further comprising
a storage unit configured to store a settable setting type for each of the plurality of setting items,
wherein the setting item selection unit is configured to refer to settable setting types stored in the storage unit to determine the setting items having the common setting type.

23. The control system according to claim 20,
wherein the new setting value button represents the settings for the setting items in the group of setting items as a single setting item for setting the single setting, and
wherein the setting value accepting unit is configured to accept the single setting in response to the single setting being set using the single setting item represented by the new setting value button, and
wherein the setting unit is configured to set the single setting accepted through the setting value accepting unit to all of the setting items in the group of setting items simultaneously in response to the single setting being set using the single setting item represented by the new setting value button.

24. A controller configured to:
display a plurality of setting items regarding the controller on a display;
display a plurality of setting value buttons corresponding to the plurality of setting items on the display, wherein each setting value button of the plurality of setting value buttons represents a setting for a corresponding one of the plurality of setting items;
select a group of setting items comprising a selectable number of setting items to which a same setting is to be set simultaneously, from among the plurality of setting items displayed on the display, based on externally inputted instructions;
display a new setting value button in response to selecting the group of setting items, wherein the new setting value button represents settings for the setting items in the group of setting items;
accept a single setting to be set equally to the setting items in the group of setting items; and
set the accepted single setting to all of the setting items in the group of setting items simultaneously.

25. The controller according to claim 24,
wherein the new setting value button represents the settings for the setting items in the group of setting items as a single setting item for setting the single setting, and wherein the controller is configured to accept the single setting occurs in response to the single setting being set using the single setting item represented by the new setting value button, and wherein the controller is configured to accept the accepted single setting to all of the setting items in the group of setting items simultaneously occurs in response to the single setting being set using the single setting item represented by the new setting value button.

* * * * *